(12) United States Patent  
Nakanishi

(10) Patent No.: US 8,799,805 B2  
(45) Date of Patent: Aug. 5, 2014

(54) OPERATION APPARATUS, IMAGE FORMING APPARATUS HAVING THE SAME, AND OPERATION METHOD

(75) Inventor: Shinichi Nakanishi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 411 days.

(21) Appl. No.: 13/190,055

(22) Filed: Jul. 25, 2011

(65) Prior Publication Data

US 2012/0030605 A1 Feb. 2, 2012

(30) Foreign Application Priority Data

Jul. 28, 2010 (JP) ................................. 2010-169719

(51) Int. Cl.  
*G06F 3/048* (2013.01)

(52) U.S. Cl.  
USPC ........................................................ 715/773

(58) Field of Classification Search  
CPC ...................................................... G06F 3/048  
See application file for complete search history.

(56) References Cited

U.S. PATENT DOCUMENTS

| | | | | |
|---|---|---|---|---|
| 5,287,514 A | * | 2/1994 | Gram | 715/826 |
| 5,530,869 A | * | 6/1996 | Salle | 717/113 |
| 5,574,843 A | * | 11/1996 | Gerlach, Jr. | 345/418 |
| 5,940,076 A | * | 8/1999 | Sommers et al. | 715/834 |
| 5,986,638 A | * | 11/1999 | Cheng | 715/857 |
| 7,298,503 B2 | * | 11/2007 | Christiansen et al. | 358/1.13 |
| 7,299,233 B2 | * | 11/2007 | Ikegawa | 1/1 |
| 2002/0015598 A1 | | 2/2002 | Maeda et al. | |
| 2002/0136563 A1 | * | 9/2002 | Maeda et al. | 399/81 |
| 2006/0274347 A1 | * | 12/2006 | Mori | 358/1.13 |
| 2007/0150834 A1 | | 6/2007 | Muller et al. | |

OTHER PUBLICATIONS

Office Action mailed Aug. 19, 2013 in Chinese Patent Application No. 201110219447.4.

* cited by examiner

*Primary Examiner* — Phenuel Salomon  
(74) *Attorney, Agent, or Firm* — Knobbe Martens Olson & Bear LLP

(57) ABSTRACT

Provided is an operation apparatus including: a touch panel which selectably displays a plurality of function item keys, and selection item keys corresponding to each of the plurality of function item keys; a shortcut acceptance unit which generates an icon-attached function item key by pasting to a pasting target function item key which is a function item key, an icon indicating a shortcut of a function item key which is different from the pasting target function item key, and selectably displays the icon-attached function item key, and accepts a selection of the icon-attached function item key; and a integrated screen selection acceptance unit which displays a integrated selection screen which selectably displays in a same screen a selection item key which corresponds to the pasting target function item key, and a selection item key which corresponds to a function item key identified by an icon in the touch screen.

7 Claims, 16 Drawing Sheets

FIG. 8B

| FUNCTION ITEM | OTHER FUNCTION ITEM — 808a | FIRST COMBINABILITY INFORMATION |
|---|---|---|
| ... | ... | ... |
| COLLATE / OFFSET | ... | ... |
| STAPLE / PUNCH | ORIGINAL SIZE | 1 |
| | PAPER SELECTION | 1 |
| | MIXED SIZE ORIGINALS | 1 |
| | ORIENTATION OF THE ORIGINAL | 1 |
| | COLLATE / OFFSET | 0 |
| | PAPER OUTPUT | 1 |

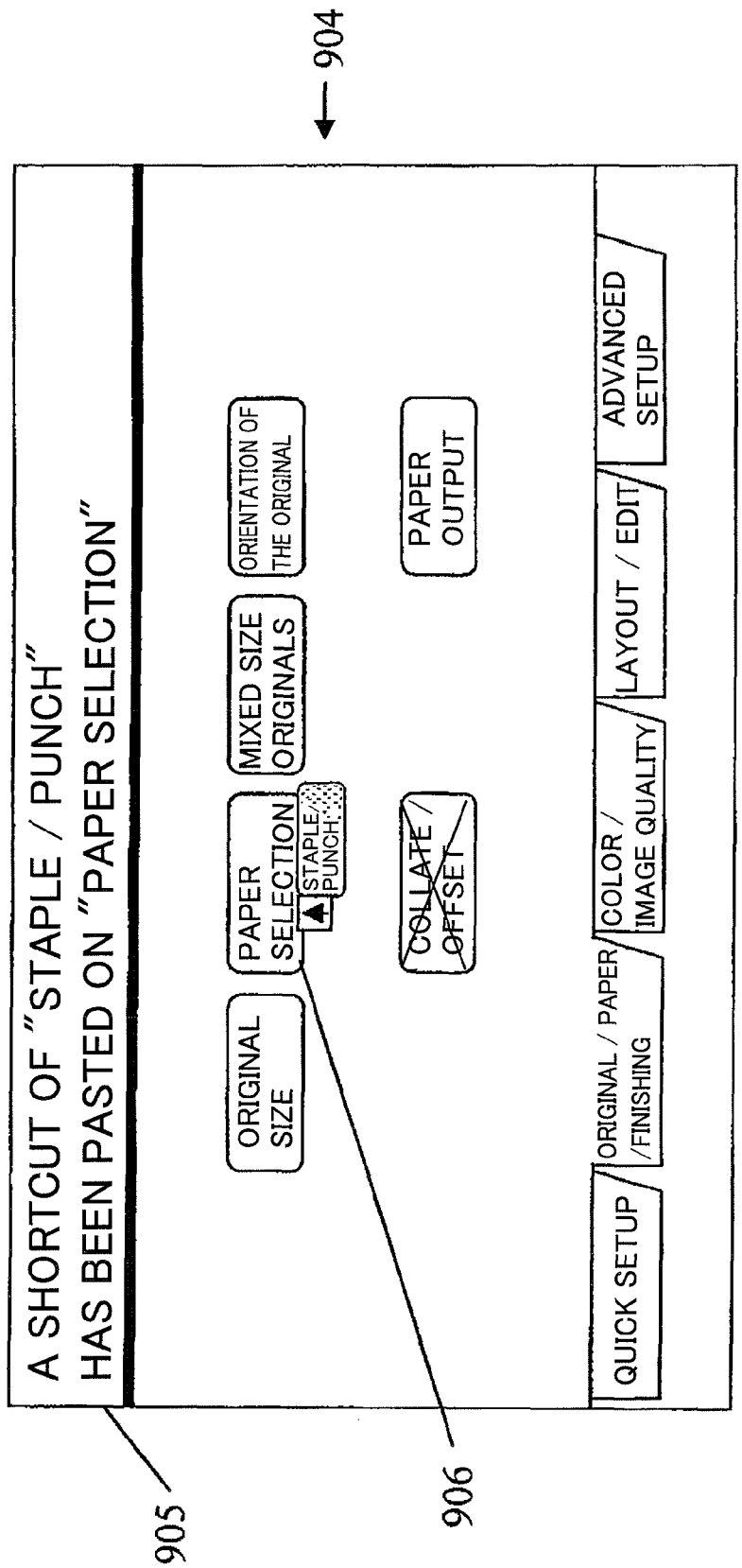

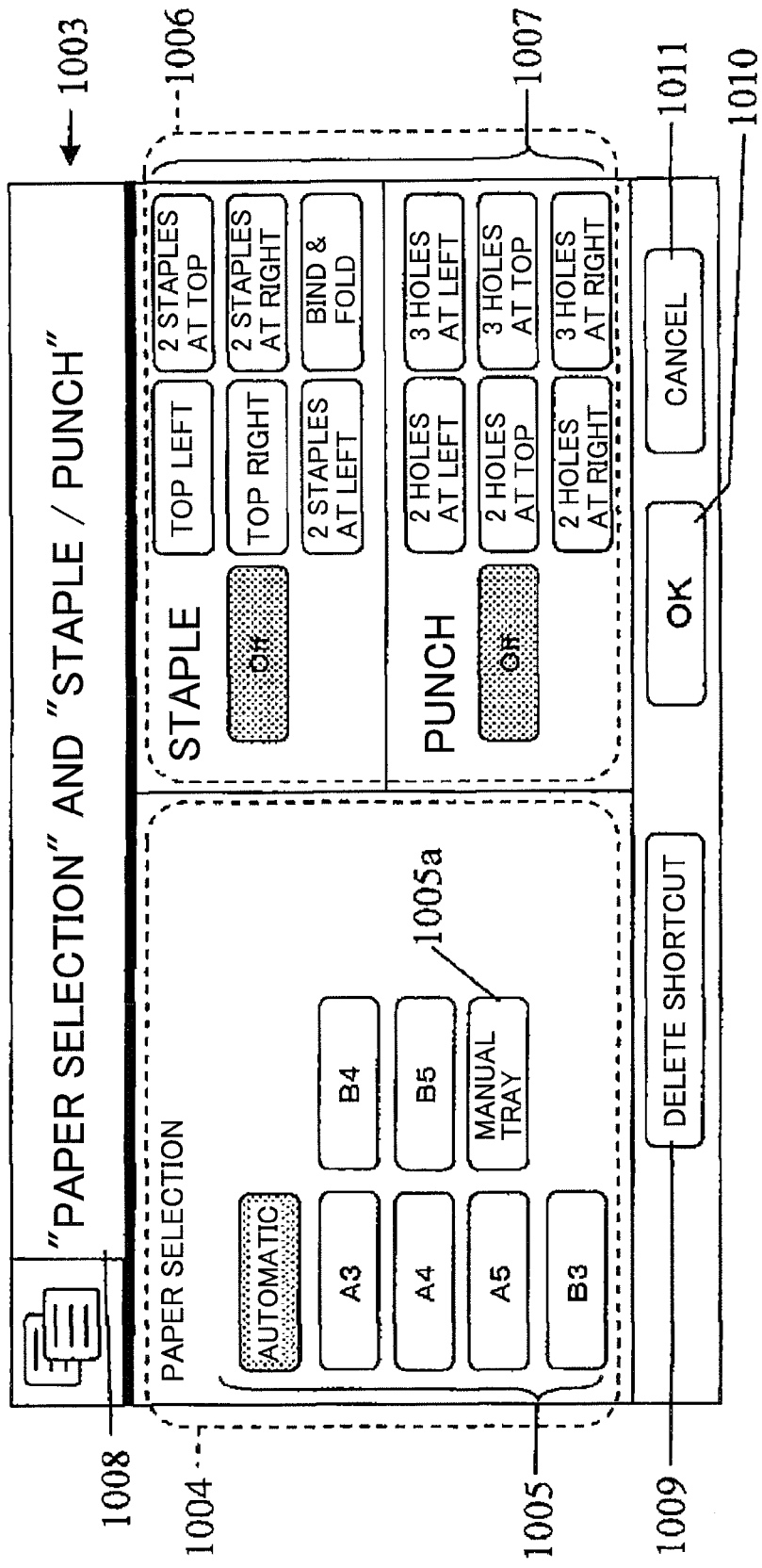

OPERATION APPARATUS, IMAGE FORMING APPARATUS HAVING THE SAME, AND OPERATION METHOD

This application is based on and claims the benefit of priority from Japanese Patent Application No. 2010-169719, filed on 28 Jul. 2010, the content of which is incorporated herein by reference.

BACKGROUND OF THE INVENTION

1. Field of the Invention

The present invention relates to an operation apparatus, an image forming apparatus having the same, and an operation method.

2. Related Art

In recent years, techniques that display on the screen a liking key to which desired setting conditions for the functions of an image forming apparatus can be assigned are adopted in operation apparatuses provided in image forming apparatuses such as copiers, facsimile transmission and receiving machines, and multi function peripherals.

For example, when assigning selection items, "COLOR" and "PUNCH", which belong to a predetermined function item "COPY", among a plurality of function items which indicate functions, the user first selects a specific function item, "COPY" key in a function selection screen where a plurality of function item keys are selectably displayed, to display a function setting screen assigned to "COPY". Here, a plurality of selection item keys associated to the above "COPY" and the liking key are selectably displayed on the above function setting screen. Then, when the user selects a liking key after selecting the selection items, "COLOR" key and "PUNCH" key, a setting condition (output condition) for the above "COLOR" and a setting condition for "PUNCH" are assigned to the liking key. Accordingly, when the user selects the liking key next, the assigned setting conditions are set (inputted) without the user selecting "COLOR" key and "PUNCH" key of the function setting screen. Therefore, the number of key operation by the user is reduced.

However, in the operation apparatus described above, since the liking key is selectably displayed only in the function setting screen, a setting condition assigned to the liking key is only the setting condition of the selection item key selectably displayed in the function setting screen. Therefore, assignment work (pasting work) is needed for every function item. As a result, the assignment work by the user has become complicated.

In contrast, in a conventional technique, for example, an operation apparatus is disclosed, which can display on the display a shortcut key display screen having a shortcut key which can be assigned a setting condition of any function item among a plurality of function items, and is provided with an assignment instruction key for instructing to a plurality of function setting screens to assign the setting condition of the function item to the shortcut key. In the operation apparatus, when the assignment instruction key is selected, the setting condition of a series of function items set by the time the function setting screen having the assignment instruction key is displayed on the display is assigned to the shortcut key. As such, it is written that setting conditions of a series of function items set through respective function setting screens can be assigned to a predetermined shortcut key, and there is no necessity of doing assignment work for every function item as in conventional techniques, and assignment work is simplified, and the operativity of the operation apparatus can be improved.

In the above conventional technique, setting conditions Of a series of function items that have been set can be assigned to predetermined shortcut keys. However, since the setting conditions of a series of function items to be assigned are various and diversified for each user, it is often the case in which the setting conditions of a series of function items assigned by one user cannot be used by other users.

In addition, when the user sets (inputs) a setting condition of a predetermined function item through the function selection screen where a plurality of function item keys are displayed, usually, in many cases, setting conditions of a plurality of function items are combined. Therefore, if setting conditions for a plurality of function items that are associated in advance can be set in the same screen with one key operation by associating in advance function items that are combined repeatedly in a certain form with each other, it may be possible to reduce the number of times of key operation and the time needed for key operation work.

SUMMARY OF THE INVENTION

Accordingly, an object of the present invention is to provide an operation apparatus that can reduce the number of key operations required to set setting conditions for a plurality of function items.

Moreover, another object of the present invention is to provide an image forming apparatus having the above operation apparatus.

In addition, another object of the present invention is to provide an operation method in the above operation apparatus capable of reducing the number of key operations required to set setting conditions for a plurality of function items.

The present invention relates to an operation apparatus including: a touch panel which selectably displays at least a plurality of function item keys, and selection item keys corresponding to each of the plurality of function item keys;

an acceptance unit which displays a function selection screen where the plurality of function item keys are displayed in the touch panel and which, when a predetermined function item key is selected among the plurality of function item keys, displays a function setting screen where a plurality of selection item keys that correspond to the selected function item key are displayed in the touch panel;

a shortcut acceptance unit which generates an icon-attached function item key by pasting to a pasting target function item key, which is a function item key selected from the plurality of function item keys, an icon indicating a shortcut of a function item key which is selected from the plurality of function item keys and is different from the pasting target function item key, and selectably displays the icon-attached function item key in the touch panel, and accepts a selection of the icon-attached function item key; and a integrated screen selection acceptance unit which, when the shortcut acceptance unit accepts a selection of the icon-attached function item key, displays a integrated selection screen which selectably displays in a same screen a selection item key which corresponds to the pasting target function item key that configures the icon-attached function item key, and a selection item key which corresponds to a function item key that is identified by an icon in the touch screen, and accepts a selection of the selection item key.

The present invention relates to an image forming apparatus having an operation apparatus, the operation apparatus including:

a touch panel which selectably displays at least a plurality of function item keys, and selection item keys corresponding to each of the plurality of function item keys;

an acceptance unit which displays a function selection screen where the plurality of function item keys are displayed in the touch panel and which, when a predetermined function item key is selected among the plurality of function item keys, displays a function setting screen where a plurality of selection item keys that correspond to the selected function item key are displayed in the touch panel;

a shortcut acceptance unit which generates an icon-attached function item key by pasting to a pasting target function item key, which is a function item key selected from the plurality of function item keys, an icon indicating a shortcut of a function item key which is selected from the plurality of function item keys and is different from the pasting target function item key, and selectably displays the icon-attached function item key in the touch panel, and accepts a selection of the icon-attached function item key; and a integrated screen selection acceptance unit which, when the shortcut acceptance unit accepts a selection of the icon-attached function item key, displays a integrated selection screen which selectably displays in a same screen a selection item key which corresponds to the pasting target function item key that configures the icon-attached function item key, and a selection item key which corresponds to a function item key that is identified by an icon in the touch screen, and accepts a selection of the selection item key.

The present invention relates to an operation method for an operation apparatus to accept a selection of a predetermined selection item key from a user among a plurality of selection item keys corresponding to function item keys, the method including:

a step performed by the operation apparatus for selectably displaying in a touch panel at least a plurality of function item keys, and selection item keys corresponding to each of the plurality of function item keys;

a step performed by the operation apparatus for displaying a function selection screen where the plurality of function item keys are displayed in the touch panel, and for displaying, when a predetermined function item key is selected among the plurality of function item keys, a function setting screen where a plurality of selection item keys that correspond to the selected function item key are displayed in the touch panel;

a step performed by the operation apparatus for generating an icon-attached function item key by pasting to a pasting target function item key, which is a function item key selected from the plurality of function item keys, an icon indicating a shortcut of a function item key which is selected from the plurality of function item keys and is different from the pasting target function item key, and for selectably displaying the icon-attached function item key in the touch panel, and for accepting a selection of the icon-attached function item key; and a step performed by the operation apparatus, for displaying, when a selection of the icon-attached function item key is accepted, a integrated selection screen which selectably displays in a same screen a selection item key which corresponds to the pasting target function item key that configures the icon-attached function item key, and a selection item key which corresponds to a function item key that is identified by an icon in the touch screen, and for accepting a selection of the selection item key.

BRIEF DESCRIPTION OF THE DRAWINGS

FIG. 8B is a diagram showing an example of a function item prohibition table according to the embodiment of the present invention.

FIG. 9B is a diagram showing an example of a pasting target selection screen after completion of pasting according to the embodiment of the present invention.

FIG. 10B is a first figure showing an example of a integrated selection screen according to the embodiment of the present invention.

DETAILED DESCRIPTION OF THE INVENTION

Hereafter, an embodiment of an image forming apparatus provided with an operation apparatus of the present invention will be described with reference to accompanying drawings so as to contribute to the understanding of the present invention. It should be noted that the embodiment below is an example of an implementation of the present invention and is not intended to limit the technical scope of the present invention. Moreover, a prefix "S" attached to numbers in flow charts unit "step".

Image Forming Apparatus and Operation Apparatus

Hereafter, an image forming apparatus provided with an operation apparatus according to the present embodiment will be described.

Figure 1:
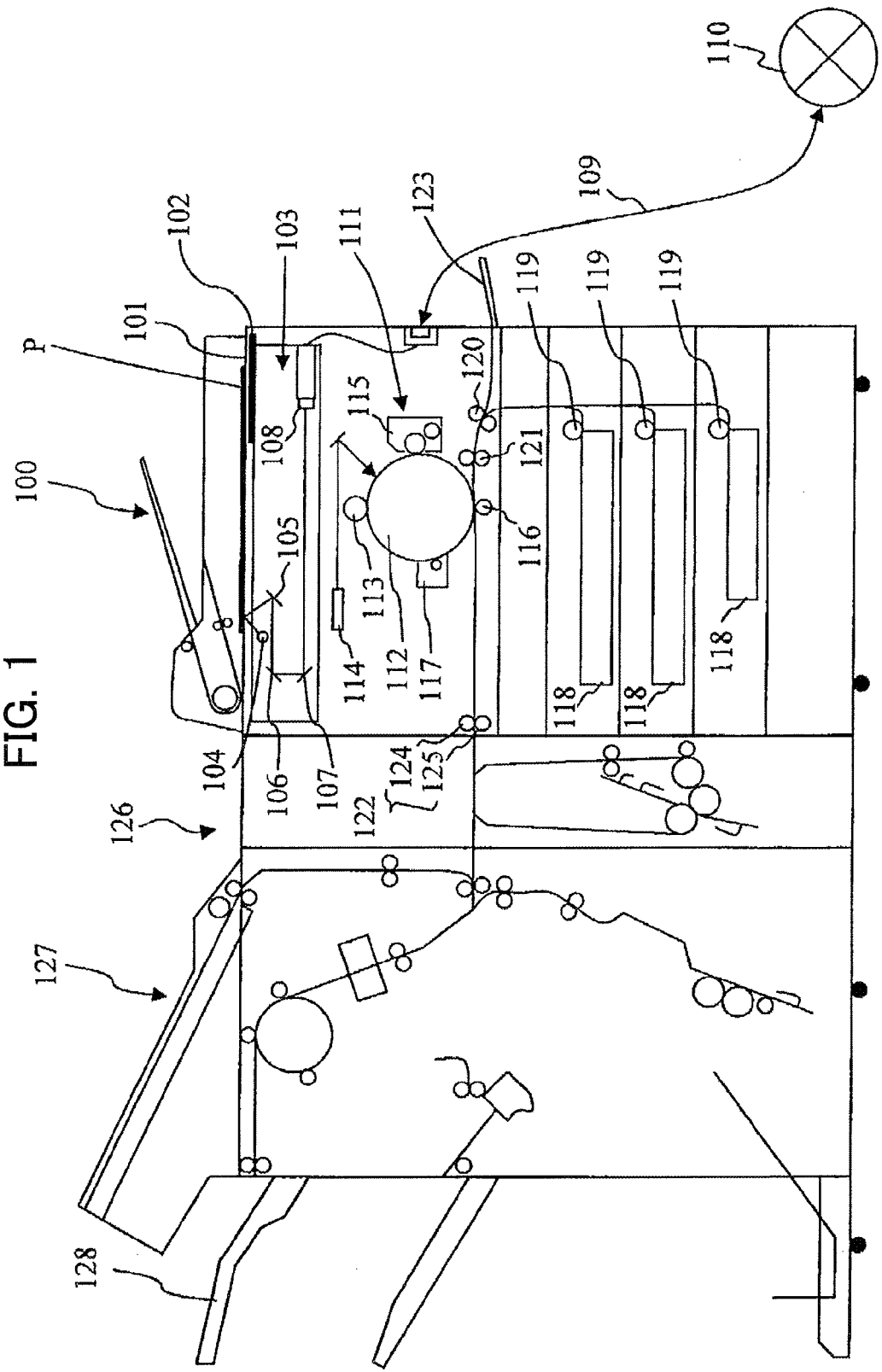
FIG. 1 is a conceptual diagram showing an entire configuration inside a multi function peripheral according to the present embodiment.

FIG. 1 is a schematic diagram of an image forming apparatus to which a folding device and a binding device are connected. It should be noted that the details of parts that are not directly related to the present invention are omitted. In addition, examples of the image forming apparatus of the present invention include a multi function peripheral provided with a printer and a single body scanner, or a printer, a copier, a scanner, a fax machine or the like, and the image forming apparatus of the present invention functions as an image forming apparatus provided with copying service, scanner service, facsimile service, printer service, or the like. Operation of a multi function peripheral 100 (MFP: Multi Function Peripheral) in the case in which using copying service, for example, will be described briefly below.

First, when using the multi function peripheral 100, the user places an original P on a platen 101 arranged at a top face of the multi function peripheral 100, and inputs setting of copying service from an operation unit 102. In the operation unit 102 (touch panel 201), a plurality of function item keys related to the copying service which the multi function peripheral 100 provides (for example, "ORIGINAL SIZE" key and "PAPER SELECTION" key) may be selectably displayed in the function selection screen, and a plurality of selection item keys corresponding to a predetermined function item ("PAPER SELECTION") (for example, "A3" key and "A4" key) may be selectably displayed on the function setting screen. The user performs input of a setting condition (output condition) related to the copying service by displaying on the operation unit 102 (touch panel 201) a plurality of selection item keys corresponding to the function item key that is selected by selecting the function item key displayed on the operation unit 102 (touch panel 201), and selecting or inputting the displayed selection item key.

After completing the selection or input of a setting condition, the user makes the multi function peripheral 100 start the process of the copying service by pressing a start key provided at the operation unit 102.

When the multi function peripheral 100 starts the process of copying service, an image reader 103 irradiates light from a light source 104 onto the original placed on the platen 101. Then, the light reflected from the original is guided to an imaging device 108 by mirrors 105, 106, and 107. The imaging device 108 performs photoelectric conversion of the guided light and outputs the resultant as an electrical signal. Then, a processing circuit (not illustrated) performs a fundamental correction process, image quality process, compression process, and the like, and generates an image data corresponding to the image formed on the surface of the original.

It should be noted that the multi function peripheral 100 may receive the image data transmitted from a network 110 together with an instruction of an output (image forming) through a communication cable 109 connected to the multi function peripheral 100. In this case, the process at the image reader 103 is omitted.

The image forming unit 111 forms the toner image based on image data and transfers the above toner image onto the sheets. The above image forming unit 111 is provided with a photo conductor drum 112. The photo conductor drum 112 rotates in a predetermined direction at a constant speed. An electrifier 113, an exposure unit 114, a developer 115, a transferor 116, a cleaning unit 117, and the like are arranged around the photo conductor drum 112 sequentially from the upstream of the rotation direction.

The electrifier 113 electrifies uniformly the surface of the photo conductor drum 112. The exposure unit 114 irradiates laser based on the above image data and forms an electrostatic latent image on the electrified surface of the photo conductor drum 112. The above developer 115 forms a toner image on the surface of the photo conductor drum 112 by adhering toner to the conveyed electrostatic latent image. The transferor 116 transfers the toner image formed on the photo conductor drum to the recording medium (for example, a sheet). The cleaning unit 117 removes excessive toner left on the surface of the photo conductor drum 112. Such a series of processes are performed in association of the rotation of the photo conductor drum 112.

The sheet is conveyed from a plurality of paper feed cassettes 118 provided in the multi function peripheral 100. When the sheet is conveyed, the sheet is drawn out by the pickup roller 119 from any one of the paper feed cassettes 118 to the conveyance path. Sheets of different types of paper are accommodated in respective paper feed cassettes 118, and a sheet is fed based on the setting of the output condition.

The sheet drawn out to, the conveyance path is sent in between the photo conductor drum 112 and the transferor 116 by conveyance rollers 120 and resist rollers 121. The sheet sent as such is subjected to the transfer of a toner image by the transferor 116 and is conveyed to a fixing unit 122. It should be noted that there are cases when the sheet conveyed to the conveyance rollers 120 is conveyed from a manual tray 123 provided in the multi function peripheral 100.

When the sheet on which the toner image is transferred passes through between a heating roller 124 and a press roller 125 provided at the fixing unit 122, the toner image (visible image) is fixed onto the sheet by the heat and the pressure being applied to the toner image. The amount of heat of the heating roller 124 is set optimum according to the type of paper so that the fixing is performed appropriately. The image formation is completed by the toner image (visible image) being fixed onto the sheet. Then, the sheet on which the toner image (visible image) is fixed is conveyed to the folding device 126 through the fixing unit 122.

According to the setting of the output condition to which the user inputted, the conveyed sheet is subjected to folding processing at the folding device 126. When a folding processing function is not set, the sheet only passes through the folding device 126. In addition, in the case in which the user has set post-processing (for example, staple, punch, and binding) to the output condition, the sheet that passed through is subjected to predetermined post-processing after being conveyed to the binding device 127 and is stacked and placed on an ejection tray 128.

It should be noted that the folding device 126 and the binding device 127 are detachable from the multi function peripheral 100. When the folding device 126 and the binding device 127 are detached, the sheet on which a visible image is fixed at the fixing unit 122 is stacked and placed as a printout on the ejection tray 128 provided at the side face of the multi function peripheral 100.

With the above procedures, the multi function peripheral 100 provides copying service to the user. It should be noted that the above image reader 103, the image forming unit 111, or the like is driven to provide other services. The multi function peripheral 100 of the present embodiment may provide a print out service which performs image formation based on image data transmitted from the network 110, a scan service which reads an image on the original, a facsimile transmitting and receiving service which transmits and receives image data to and from the network 110, and a memory service which saves image data that was read once.

In addition, the multi function peripheral 100 may provide a post-processing service by the folding device 126 and the binding device 127 being connected to the multi function peripheral 100. Examples of the post-processing include binding output processing which works on a set of outputted sheets to make a booklet (for example, binding and folding), stapling output processing which staples and binds at predetermined locations in the set of sheets (for example, top left location), and punching output processing which opens holes at predetermined locations in the set of sheets (for example, two holes at left side) but the post-processing is not limited to these.

Figure 2:
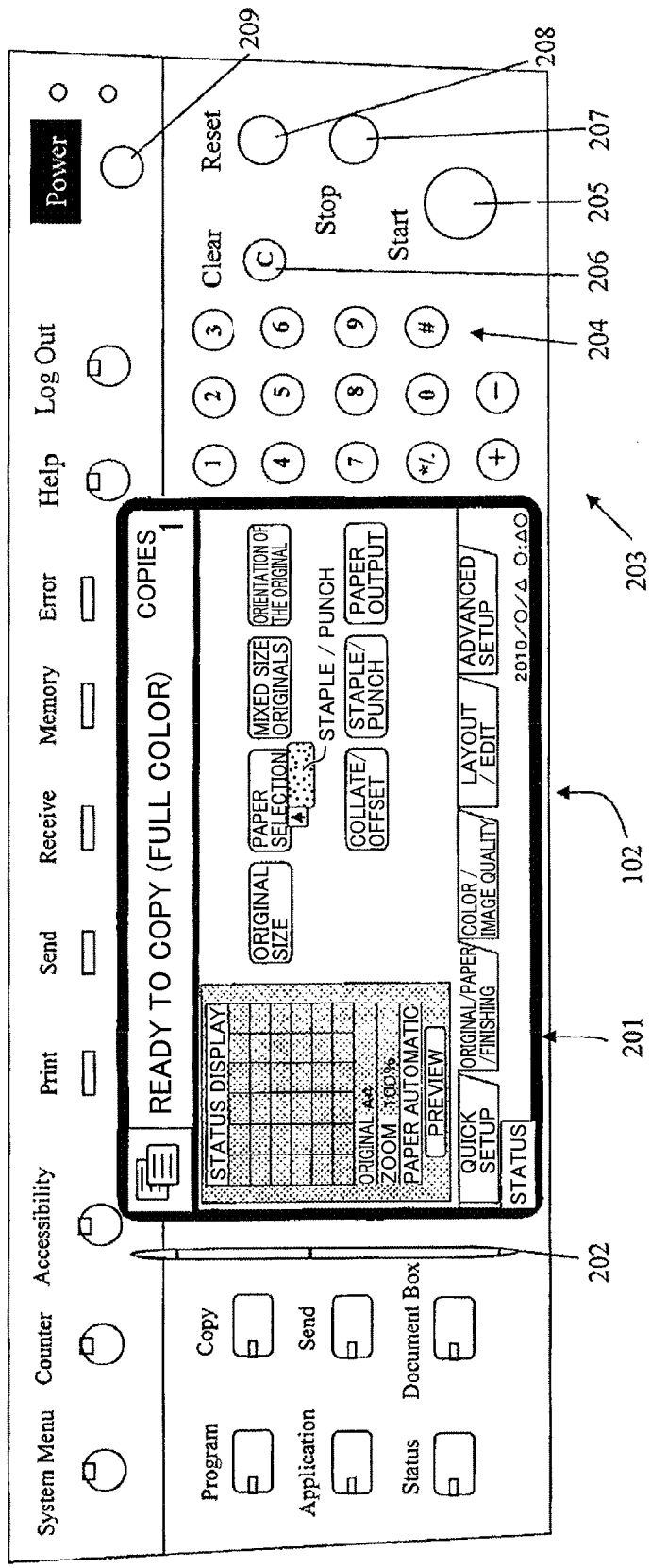
FIG. 2 is a conceptual diagram showing an entire configuration of an operation unit according to the present embodiment.

FIG. 2 is a conceptual diagram showing an entire configuration of the operation unit according to the present embodiment. Using the operation unit 102, the user inputs output conditions regarding image formation such as one described above, characters, or the like, or confirms the inputted output conditions and characters. When the output condition, the characters, or the like are inputted, the touch panel 201 (operation panel), a touch pen 202, and operation keys 203 which are provided at the operation unit 102 are used for the input.

The touch panel 201 is provided with a display 201*a* which can display a plurality of function item keys and selection item keys corresponding to the function item keys, and a touch sensor 201*b* arranged forming a lamination at the display surface of the display 201*a*.

An analog resistance film type touch sensor is adopted in the present embodiment as the touch sensor 201*b*.

The touch sensor 201*b* has a structure in which an upper film having translucency and a lower glass substrate are piled up via a spacer. A transparent electrode layer containing ITO (Indium Tin Oxide) or the like is provided at both opposed surfaces of the upper film and the lower glass substrate.

The touch sensor 201*b* is configured so that when the upper film is pressed down by the user, a transparent electrode layer at the side of the upper film and a transparent electrode layer at the side of the lower glass substrate at a location corresponding to the pressed location (location specified or contacted by the user, or area contacted by the user).

By applying voltage to the upper film or the lower glass substrate and taking out the voltage value corresponding to the pressed location from the lower glass substrate or the upper film, the touch sensor 201*b* detects coordinate values corresponding to the voltage value (pressed location).

If the detected pressed location is included in the display areas of a function item key in the function selection screen, a selection item key in the function setting screen, or the like, displayed on the touch panel, the operation unit 102 accepts an input (setting) of the details of the function item, the selection item, or the like.

In addition, a display 201*a* such as LCD (Liquid Crystal Display) is arranged under the lower glass substrate.

By the display displaying screens such as a function selection screen and a function setting screen, a specific screen is displayed on the touch panel 201.

As described above, the touch panel 201 has both a function to display a setting condition or the like such as a function item key and a selection item key, and a function to perform setting, input, or the like of a setting condition, such as a selection (specification) of a function item key and a selection (specification) of a selection item key.

In addition, a touch pen 202 is provided near the touch panel 201. When the user makes a tip of the touch pen 202 contact on the touch panel 201 (touch sensor 201*b*), the touch panel 201 detects coordinate values corresponding to the contacted location (pressed location). When there is (when there is displayed) a (duplicate) function item key, selection item key, or the like, that corresponds to the detected coordinate value, that function item key or the selection item key is selected. That is, the user can select the displayed function item key, the selection item key, or the like with the touch pen 202 by pressing them.

Furthermore, a predetermined number of operation keys 203 are formed near the touch panel 201. The operation keys 303 include numeric keys 204, a start key 205, a clear key 206, a stop key 207, a reset key 208, and a power key 209, for example.

Figure 3:
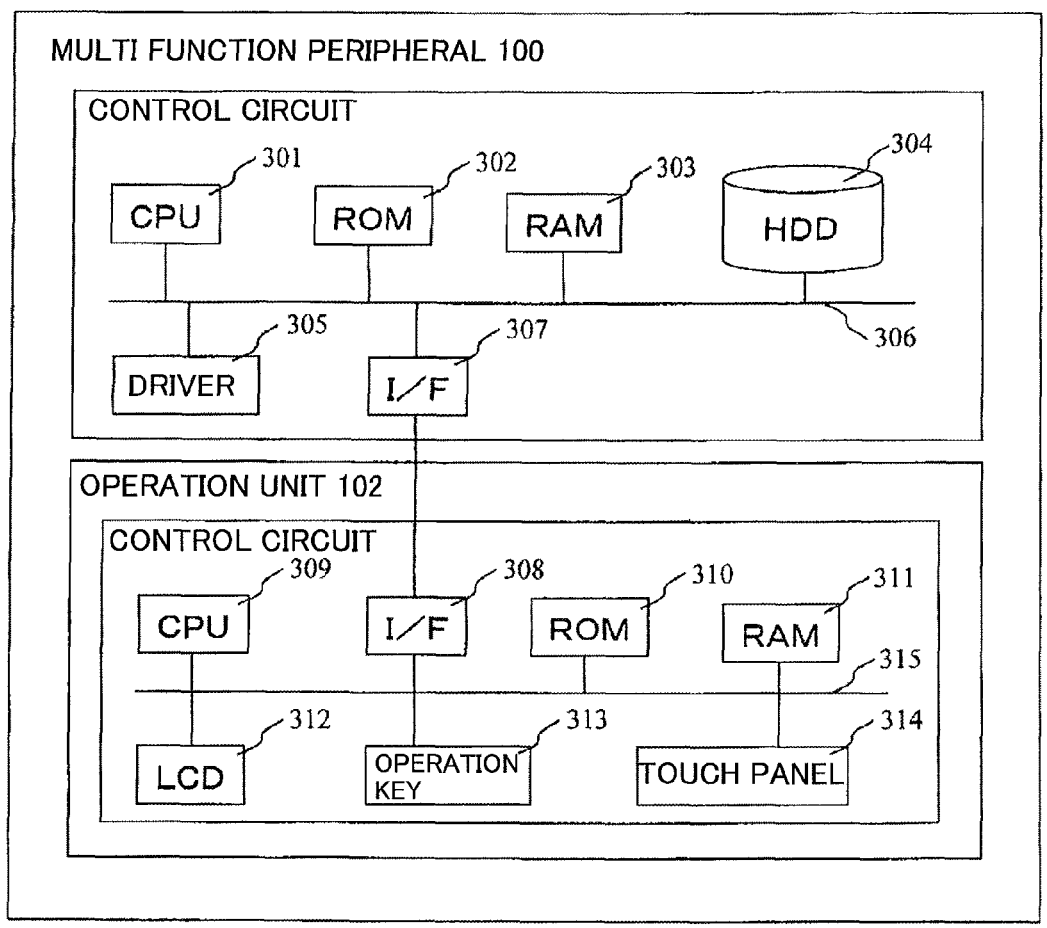
FIG. 3 is a diagram showing a configuration of control system hardware of the multi function peripheral and the operation unit according to the present embodiment.

Next, a configuration of control system hardware of the multi function peripheral 100 and the operation unit 102 will be described using FIG. 3. FIG. 3 is a diagram showing a configuration of control system hardware of the multi function peripheral 100 and the operation unit 102 according to the present embodiment. It should be noted that the details of parts that are not directly related to the present invention are omitted.

The control circuit of the multi function peripheral 100 is configured by connecting a CPU (Central Processing Unit) 301, a ROM (Read Only Memory) 302, a RAM (Random Access Memory) 303, an HDD (Hard Disk Drive) 304, and a driver 305 which corresponds to each driving unit, together with an internal bus 306. The CPU 301 uses the RAM 303 as workspace, for example, and executes programs stored in the ROM 302, HDD 304, or the like, and sends and receives data and instructions from the driver 305 and the operation unit 102 (not illustrated) based on the execution result to control the operation of the driving units shown in FIG. 1. In addition, unit other than driving units (shown in FIG. 5), which are described later, are achieved by the CPU 301 executing programs.

In addition, an internal interface 307 is also connected to the internal bus 306 of the control circuit, and the internal interface 307 connects the control circuit of the operation unit 102, and the like to the control circuit of the multi function peripheral 100. The CPU 301 may receive command signals from the control circuit of the operation unit 102 or the like through the internal interface 307, and may transmit command signals, data, or the like to the control circuit of the operation unit 102 or the like.

In addition, the control circuit of the operation unit 102 is configured by connecting a CPU 309, a ROM 310, a RAM 311, an LCD 312, operation keys 313 (203), a touch panel 314 (201), and an internal interface 308 together with an internal bus 315. When the user operates the operation keys 313 or the touch panel 314, the CPU 309 transmits command signals based on the operation to the control circuit of the multi function peripheral 100 through the internal interface 308. Moreover, the functions of the CPU 309, the ROM 310, and the RAM 311 are the same as that of the above, and unit (shown in FIG. 4) which are described later are achieved by the CPU 309 executing programs. Programs and data that realize the unit described below are stored in the ROM 310.

Embodiment of the Present Invention

Figure 4:
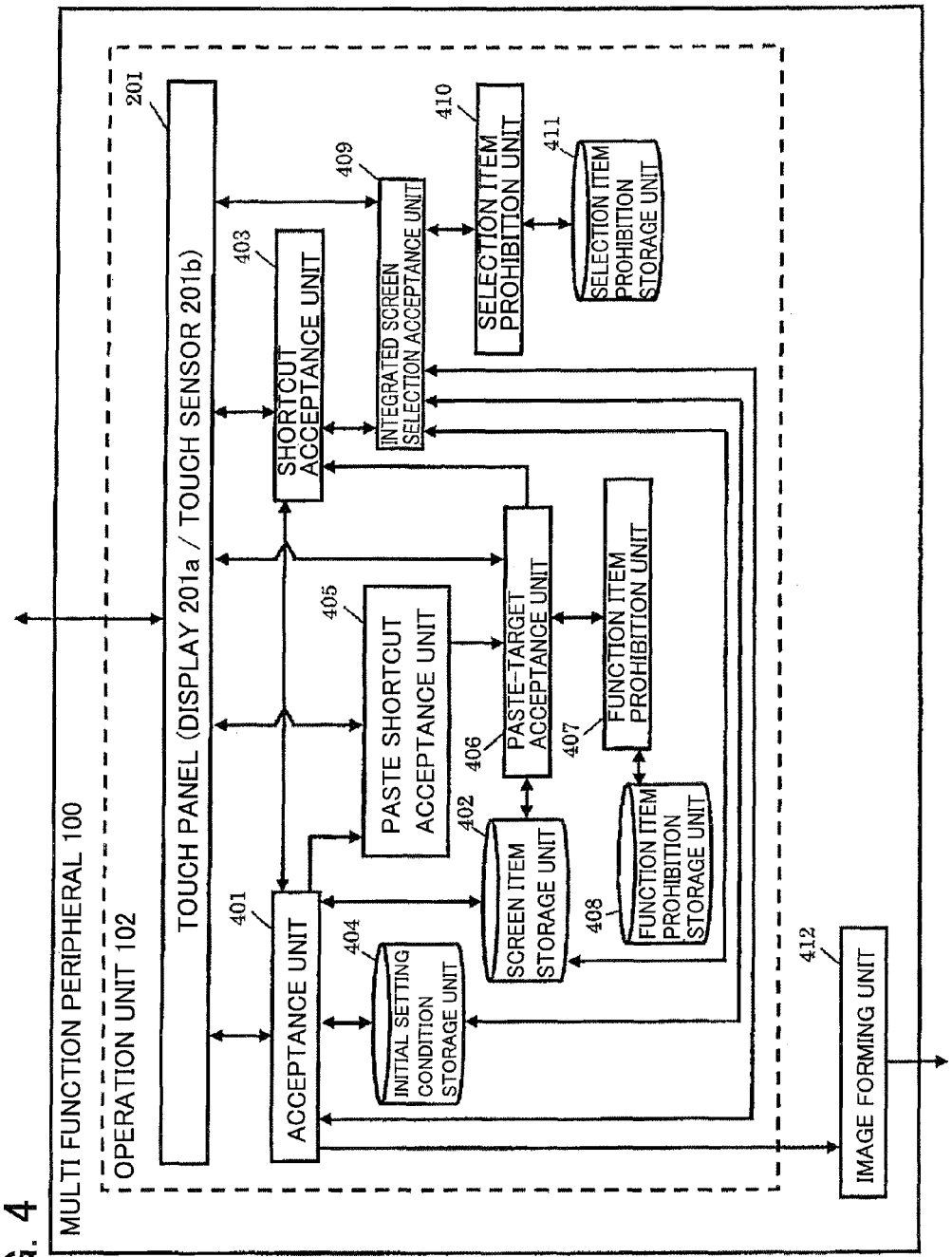
FIG. 4 is a functional block diagram of the multi function peripheral and the operation unit in the embodiment of the present invention.
Figure 5:
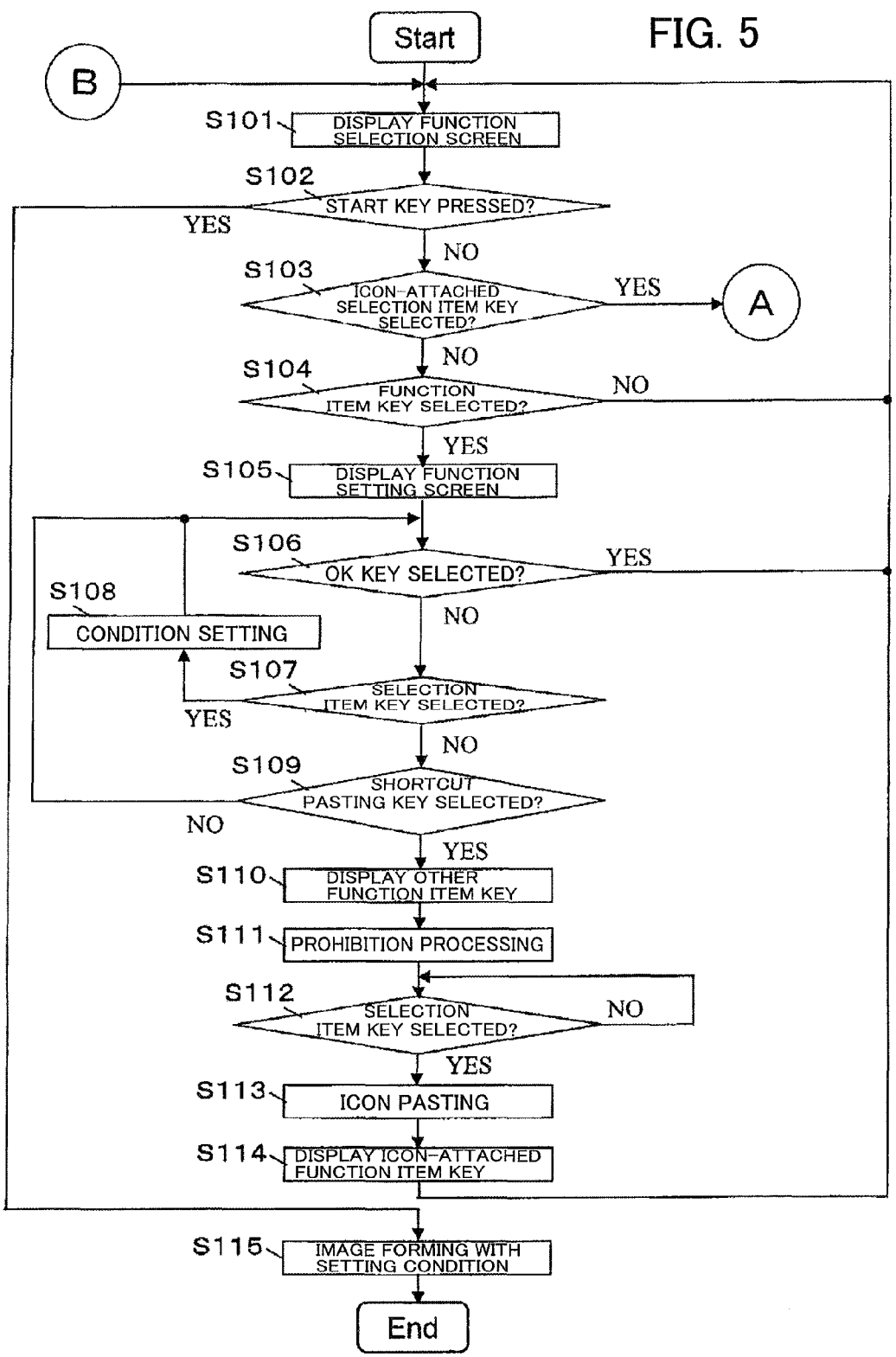
FIG. 5 is a first flow chart for showing execution procedures of the embodiment of the present invention.
Figure 6:
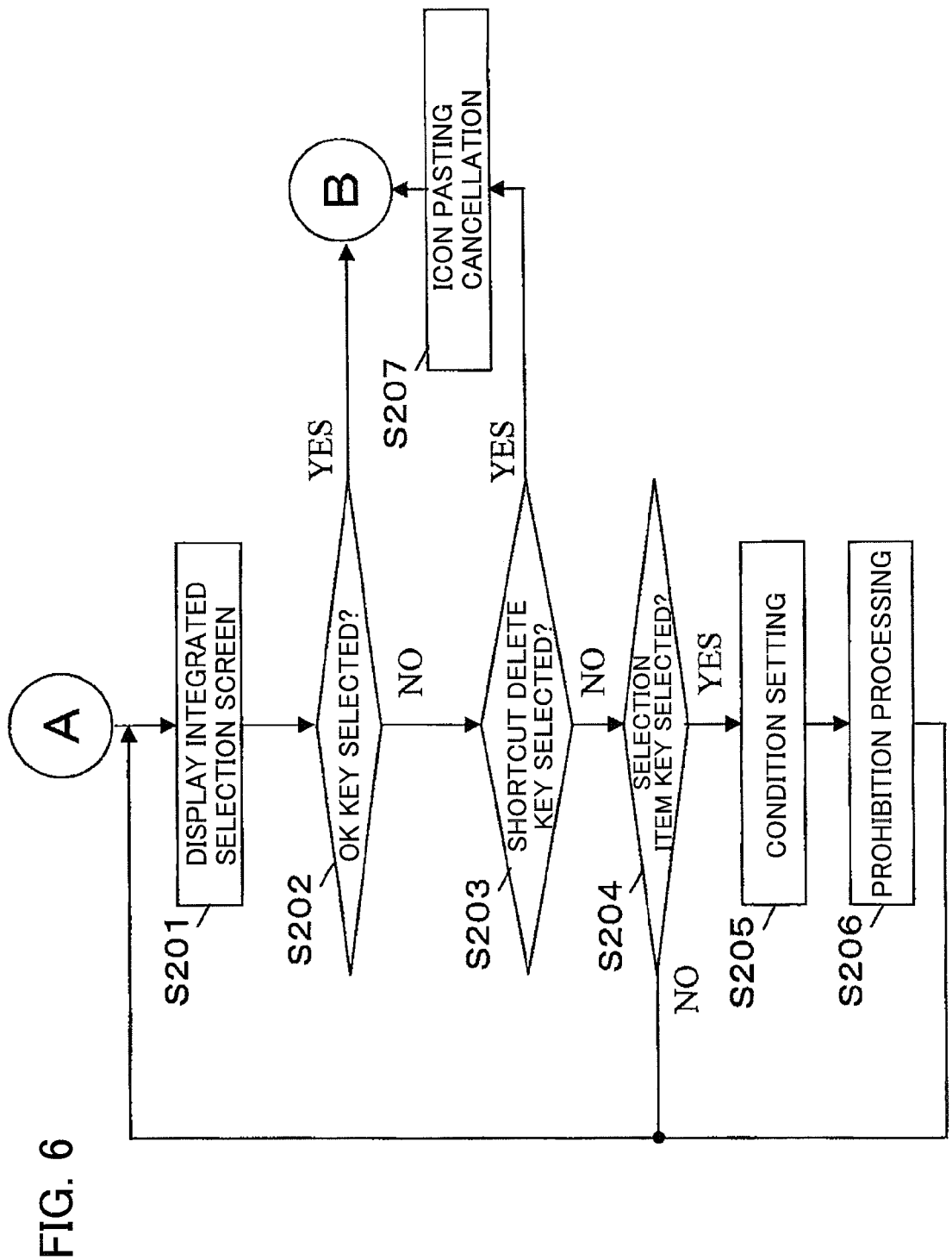
FIG. 6 is a second flow chart for showing execution procedures of the embodiment of the present invention.

Next, execution procedures of the operation unit 102 according to the embodiment of the present invention will be described with reference to FIG. 4 to FIG. 6. FIG. 4 is a functional block diagram of the operation unit and the multi function peripheral according to the embodiment of the present invention. FIG. 5 is a first flow chart for showing execution procedures according to the embodiment of the present invention. FIG. 6 is a second flow chart for showing execution procedures according to the embodiment of the present invention.

First, when the user powers on the multi function peripheral 100, the operation unit 102 is activated along with the activation of the multi function peripheral 100.

The acceptance unit 401 of the operation unit 102 refers to a screen items table that is stored in a screen item storage unit 402 in advance.

Figure 7A:
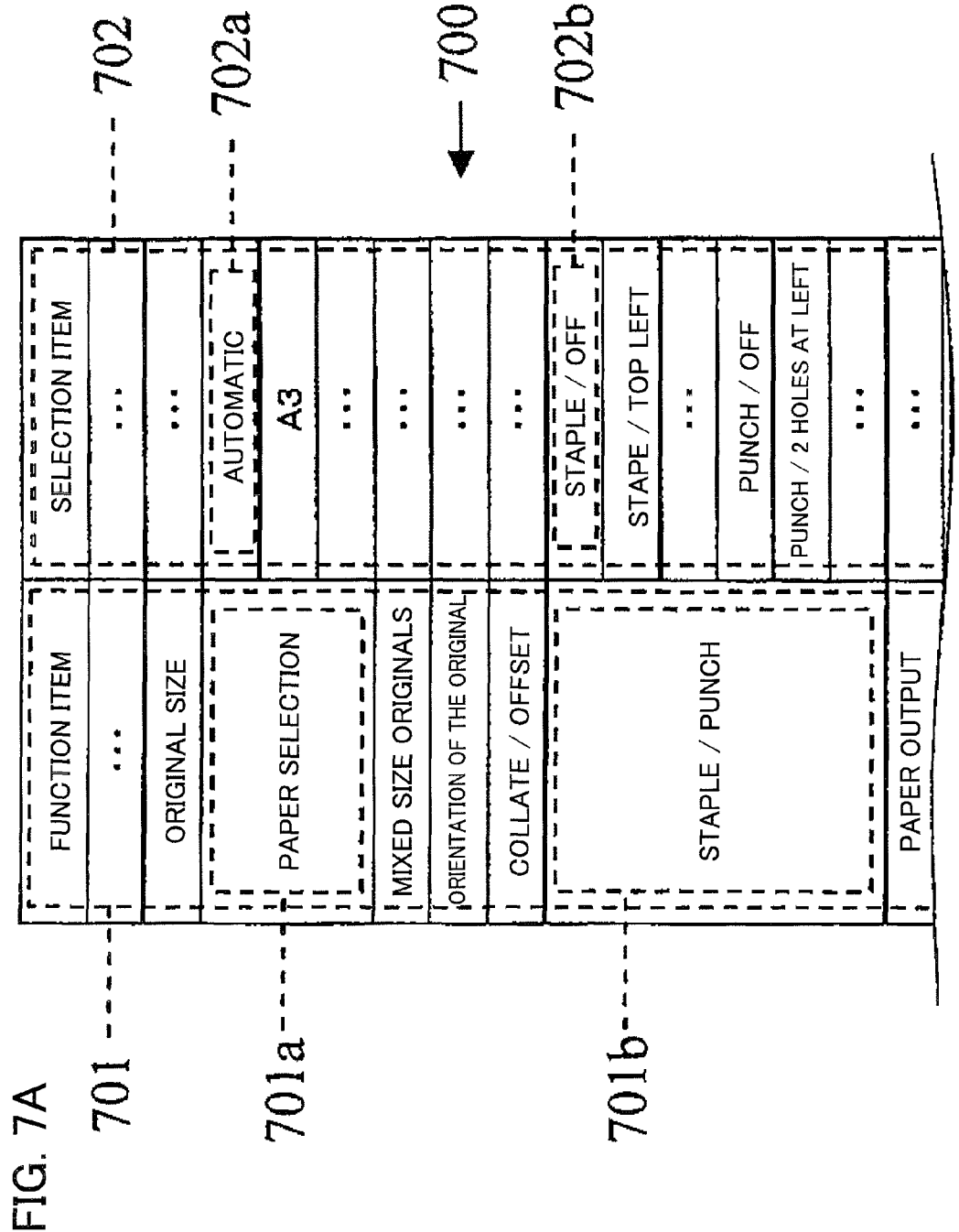
FIG. 7A is a diagram showing an example of a screen items table according to the embodiment of the present invention.

FIG. 7A is a diagram showing an example of a screen items table according to the embodiment of the present invention.

As shown in FIG. 7A, function items 701 (for example, "PAPER SELECTION" 701*a*, "STAPLE/PUNCH" 701*b*, and the like), and selection items 702 assigned for each function item (for example, "AUTOMATIC" 702*a* of "PAPER SELECTION" 701a, "STAPLE/OFF" 702b of "STAPLE/PUNCH" 701b, and the like) are associated and are stored in the screen items table 700.

The acceptance unit 401 which referred to the screen items table 700 acquires all of the stored function items 701. The acceptance unit 401 arranges the function item key 704 indicating the acquired function item 701 at a predetermined location in a function selection screen (default setting screen) provided in advance, and displays the function selection screen on the touch panel 201 (FIG. 5: S101).

When the acceptance unit 401 displays the function selection screen, the acceptance unit 401 notifies the display to a shortcut acceptance unit 403. Since icon pasting processing (shortcut pasting processing) is not yet done at this time, the shortcut acceptance unit 403 that received the notification does not provide a predetermined icon to the function item key displayed in the function selection screen. It should be noted that the case in which icon pasting processing is done will be described later.

Figure 7B:
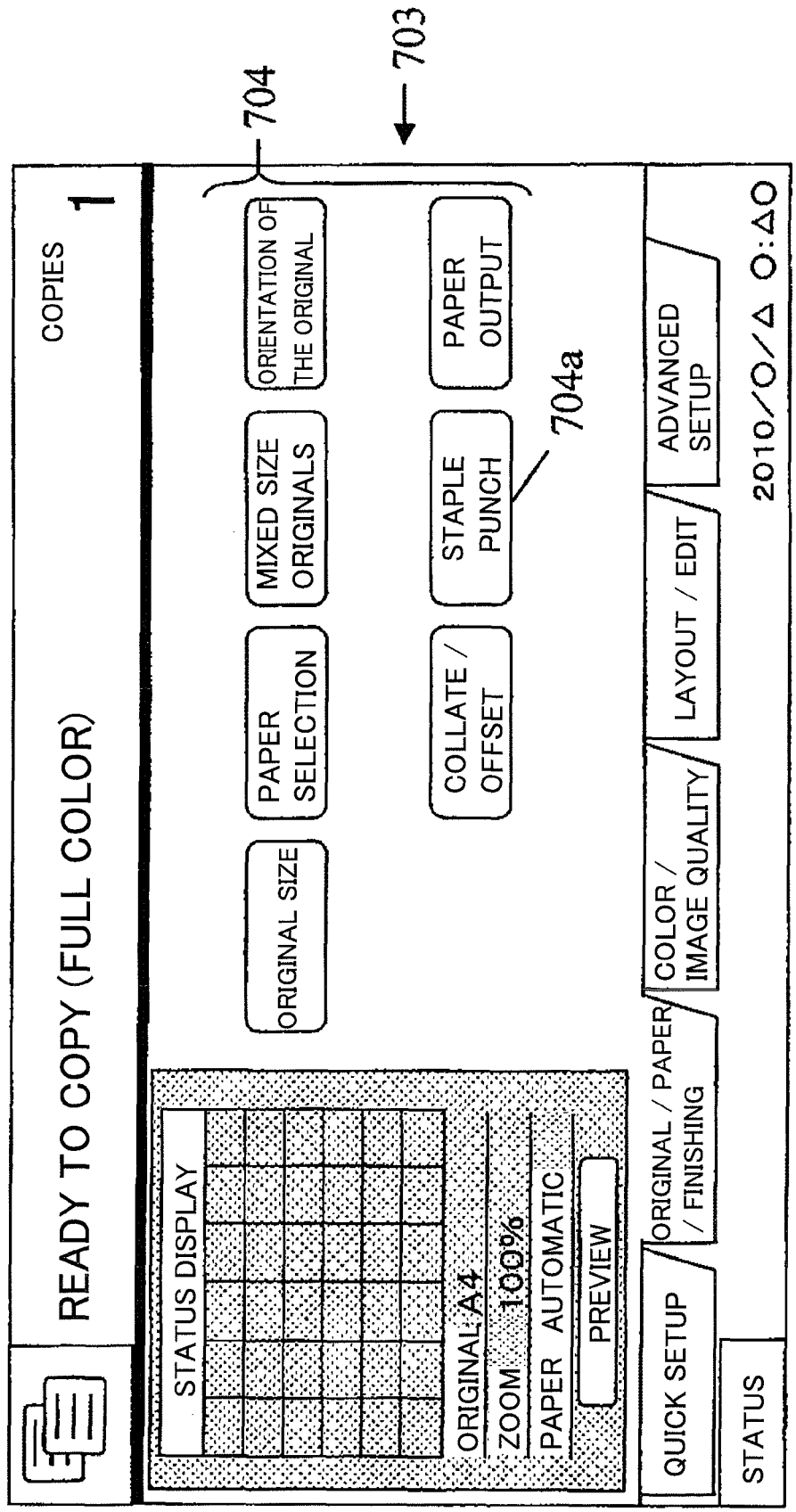
FIG. 7B is a diagram showing an example of a function selection screen according to the embodiment of the present invention.

FIG. 7B is a diagram showing an example of the function selection screen according to the embodiment of the present invention.

As shown in FIG. 7B, a plurality of function item keys 704 are selectably displayed in the function selection screen 703.

Here, when the user selects a predetermined function item key (for example, "STAPLE/PUNCH" key 704a) among a plurality of function item keys 704 without pressing the start key 205 provided in the operation unit 102, for example (FIG. 5: S102, NO) {without pressing an icon-attached function item key (FIG. 5: S103, NO)} (FIG. 5: S104, YES), the acceptance unit 401 accepts the selection of the function item key 704a. Then, the acceptance unit 401 refers to the screen items table 700 and acquires a plurality of selection items (for example, "STAPLE/OFF" 702b) corresponding to the selected function item ("STAPLE/PUNCH" 701b). Thereafter, the acceptance unit 401 arranges a plurality of acquired selection items at predetermined locations in the function setting screen to which the function item is assigned, and displays the function setting screen onto the touch panel 201 (FIG. 5: S105).

Here, upon displaying the function setting screen, the acceptance unit 401 acquires an initial setting condition (for example, "STAPLE/OFF", "PUNCH/OFF") corresponding to the function item selected by the user ("STAPLE/PUNCH" 701b) from an initial setting condition storage unit 404 which stores the initial setting condition, and displays the selection item key indicating the acquired initial setting condition by changing the background color from white color to gray color.

Furthermore, the acceptance unit 401 notifies to the shortcut pasting acceptance unit 405 that the function setting screen is to be displayed. The shortcut pasting acceptance unit 405 which has received the notification arranges and displays at a predetermined location in the function setting screen which the acceptance unit 401 displays (lower area in FIG. 8A) an shortcut pasting key 830 for pasting to other function item key an icon indicating a shortcut of the function item key ("STAPLE/PUNCH" key 704a).

Figure 8A:
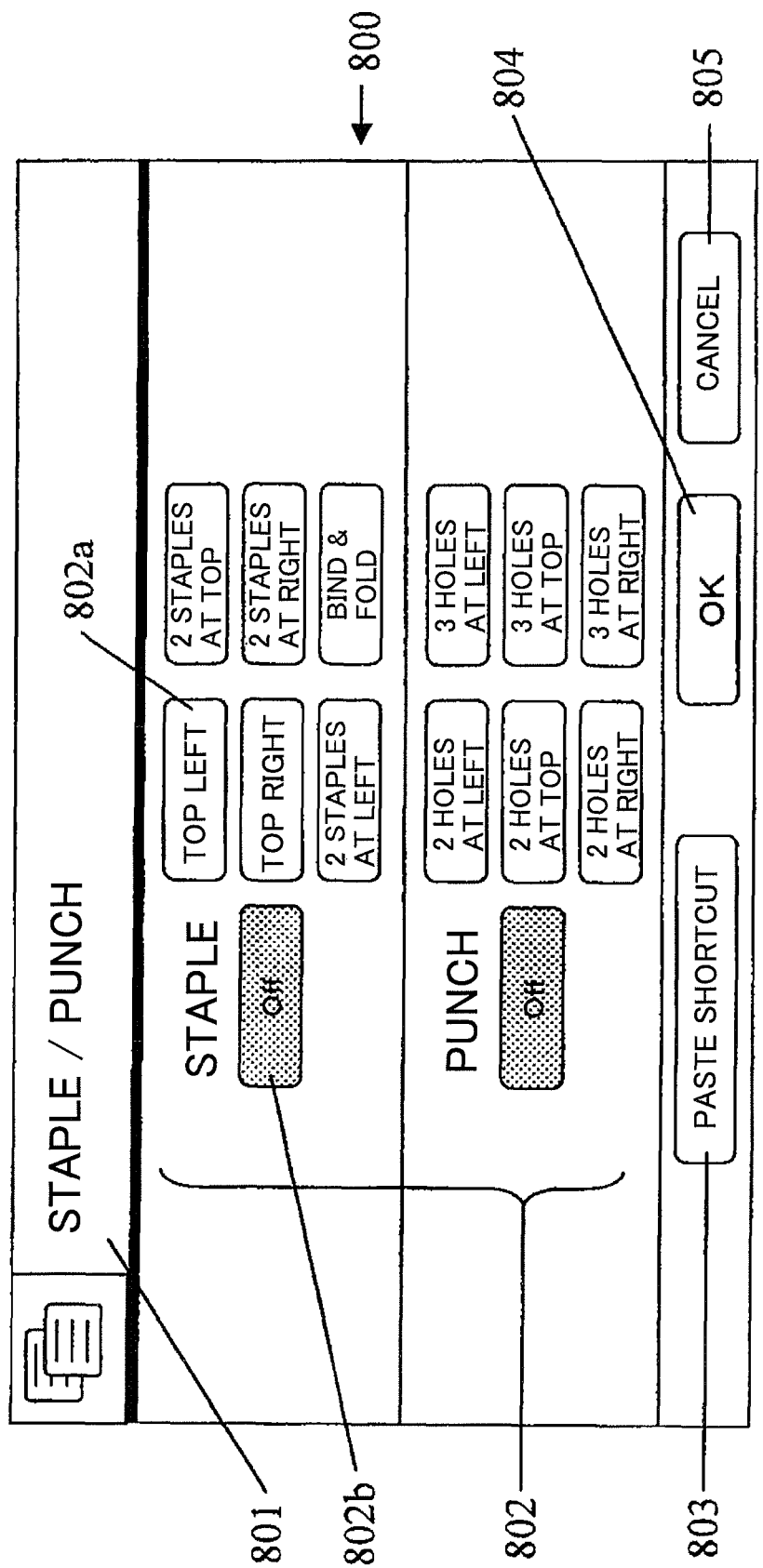
FIG. 8A is a diagram showing an example of a function setting screen according to the embodiment of the present invention.

FIG. 8A is a diagram showing an example of the function setting screen according to the embodiment of the present invention.

As shown in FIG. 8A, a message meaning that the setting screen of the function item selected by the user ("STAPLE/PUNCH" 801) is shown; a plurality of selection item keys 802 corresponding to the function item; a shortcut pasting key 803; an OK key 804; and a cancel key 805 are selectably displayed in the function setting screen 800.

Here, when the user selects (FIG. 5: S107, YES) a predetermined selection item key (for example, "STAPLE/TOP LEFT" key 802a) among a plurality of selection item keys 802 without selecting the OK key 804 (FIG. 5: S106, NO), the acceptance unit 401 accepts the selection of the selection item key 802a, and temporarily stores the setting condition corresponding to the selection item, "STAPLE/TOP LEFT", in a first setting memory (not illustrated) provided in advance, and thus the setting condition is set (FIG. 5: S108). Then, the acceptance unit 401 changes the background color of the selected selection item key ("STAPLE/OFF" key 802b) of the initial setting condition from gray color to white color, and changes the background color of the selected selection item key ("STAPLE/TOP LEFT" key 802a) from white color to gray color as well. Thereby, the user visually confirms that the setting condition for the function item "STAPLE/PUNCH" has been set. It should be noted that this is directed to a usual setting, and after this setting, the process returns to S106 and the acceptance unit 401 accepts the selection of the OK key 804, the selection item key 802, and the shortcut pasting key 803 (FIG. 5: S106).

Meanwhile, when the user selects the shortcut pasting key 803 (FIG. 5: S109, YES) without selecting the OK key 804 (FIG. 5: S106, NO), the shortcut pasting acceptance unit 405 accepts the selection of the shortcut pasting key 803, and notifies the selection to the pasting target acceptance unit 406. The pasting target acceptance unit 406 that received the notification acquires other function item (for example, "PAPER SELECTION" 701a) that is different from the function item that corresponds to the icon ("STAPLE/PUNCH" 701b) by referring to the screen items table 700, and arranges the acquired function item at a predetermined location in the pasting target selection screen provided in advance, and thus the pasting target selection screen is displayed on the touch panel 201 (FIG. 5: S110).

Here, upon displaying the pasting target selection screen, the pasting target acceptance unit 406 notifies the display to the function item prohibition unit 407. The function item prohibition unit 407 that received the notification refers to the function item prohibition table stored in the function item prohibition storage unit 408, and acquires other function item (prohibited function item) that cannot be selected by combining the function item that corresponds to the icon ("STAPLE/PUNCH" 701b) among the other function items acquired by the pasting target acceptance unit 406 (for example, "PAPER SELECTION" 701a).

FIG. 8B is a diagram showing an example of the function item prohibition table according to the embodiment of the present invention.

As shown in FIG. 8B, the function item 807 (for example, "STAPLE/PUNCH" 807a), other function item 808 different from the function item 807 (for example, "PAPER SELECTION" 808a and "COLLATE/OFFSET" 808b), and first combinability information 809 that indicates whether or not selection can be done by combining the function item 807 and other function item 808 (for example, "1" 809a that indicates selection can be done, and "0" 809b that indicates selection cannot be done) are associated with each other and being stored in the function item prohibition table 806.

For example, when the function item 807 is "STAPLE/PUNCH" 807a and the other function item 808 is "PAPER SELECTION" 808a, since "STAPLE/PUNCH" and "PAPER SELECTION" can be combined to be selected, "1" 809a is associated to and is stored in the first combinability information 809.

Meanwhile, when the function item 807 is "STAPLE/PUNCH" 807a and the other function item 808 is "COL- LATE/OFFSET" 808*b*, since "STAPLE/PUNCH" and "COLLATE/OFFSET" cannot be combined to be selected, "0" 809*b* is associated to and is stored in the first combinability information 809.

The function item prohibition unit 407 that referred to the function item prohibition table 806 acquires the other function item ("COLLATE/OFFSET" 808*b*) in which the first combinability information 809 is "0" 809*b* as a prohibited function item among the other function item 808 corresponding to the function item that is one of the function item 807 and is to be the icon. Thereafter, the function item prohibition unit 407 displays a selection disable display which cannot be selected by the user (for example, "X", and may be a grayout display) to the function item key corresponding to the acquired prohibited function item among the other function item key displayed on the touch panel 201 (display 201*a*) by the pasting target acceptance unit 406, and blocks the signal for the selection of the prohibited function item key that the pasting target acceptance unit 406 accepts and prohibits acceptance of the selection of the prohibited function item key (FIG. 5: S111).

Figure 9A:
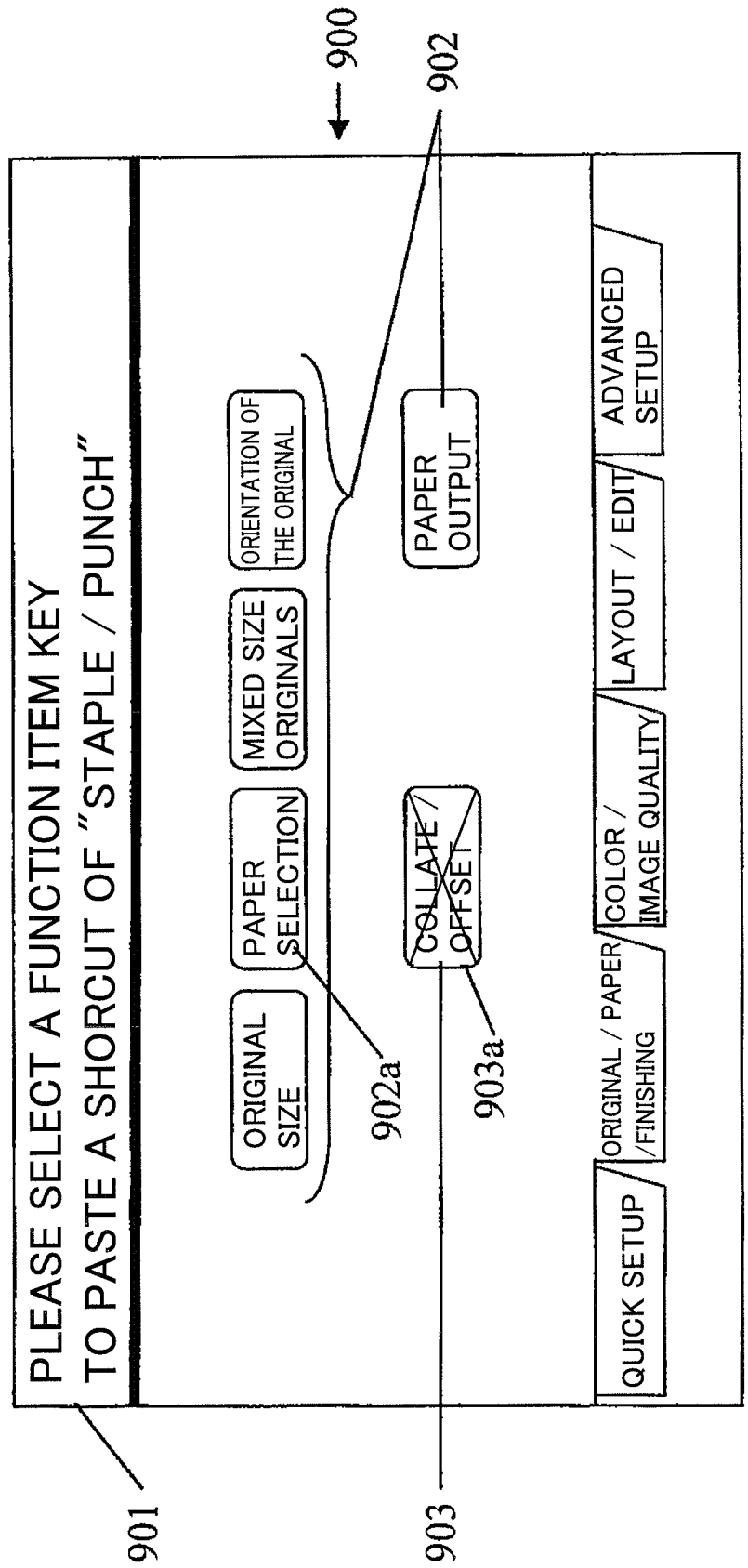
FIG. 9A is a diagram showing an example of a pasting target selection screen according to the embodiment of the present invention.

FIG. 9A is a diagram showing an example of the pasting target selection screen according to the embodiment of the present invention.

As shown in FIG. 9A, a message meaning to prompt the user to select the other function item to which an icon indicating the function item, "STAPLE/PUNCH", is to be pasted ("PLEASE SELECT A FUNCTION ITEM KEY AND PASTE A SHORTCUT OF "STAPLE/PUNCH." 901); the other function item key 902 that is to be pasting target (where the icon is pasted); and the prohibited function item key 903 to which the selection disable display 903*a* is displayed; are displayed in the pasting target selection screen 900.

Thereby, the user does not need to perform a vain key operation of pasting an icon to the prohibited function item key 903 that cannot be selected by combining with the function item that is to be the icon. In addition, the user can be informed of the prohibited function item key 903 in advance by confirming immediately visually the other function item key 902 that becomes a pasting target, and the prohibited function item key 903 that does not become a pasting target. Therefore, the user can perform the pasting work smoothly.

Now, when the user selects a predetermined other function item key (for example, "PAPER SELECTION" key 902*a*) as a pasting target (where the icon is pasted) among the other function item key 902 while looking at the pasting target selection screen 900 (FIG. 5: S112, YES), the pasting target acceptance unit 406 accepts the selection of the pasting target function item key 902*a* that becomes the pasting target (where the icon is pasted), and notifies the selection to the shortcut acceptance unit 403. The shortcut acceptance unit 403 that received the notification associates the pasting target function item (function item of the pasting place of the icon) ("PAPER SELECTION"), and the function item ("STAPLE/PUNCH") that becomes an icon in a pasting memory (not illustrated) provided in advance. Then, the shortcut acceptance unit 403 performs icon pasting processing based on the information stored in the pasting memory (FIG. 5: S113).

Next, the shortcut acceptance unit 403 pastes to the pasting target function item key 902*a* in the pasting target selection screen 900 an icon indicating a shortcut of the function item key stored in the pasting memory by associating with the pasting target function item. Then, the shortcut acceptance unit 403 displays a message meaning that shortcut pasting processing is completed on the pasting target selection screen 900 (FIG. 5: S114). The shortcut acceptance unit 403 generates an icon-attached function item key and displays it on the touch panel 201 (display 201*a*) as well.

FIG. 9B is a diagram showing an example of the pasting target selection screen after completing the pasting according to the embodiment of the present invention.

As shown in FIG. 9B, a message meaning that the pasting is completed ("SHORTCUT OF 'STAPLE/PUNCH' IS PASTED ON 'PAPER SELECTION'". 905), and the icon-attached function item key ("PAPER SELECTION" key 1002 with "STAPLE/PUNCH" icon) are displayed in the post-pasting-completion pasting target selection screen 904. Thereby, the user can know that icon pasting processing is completed.

Here, when a predetermined time period has lapsed since the post-pasting-completion pasting target selection screen 906 is displayed (several seconds to tens of seconds), the shortcut acceptance unit 403 closes the post-pasting-completion pasting target selection screen 906 and notifies the lapse to the acceptance unit 401. The acceptance unit 401 that received the notification newly displays a function selection screen on the touch panel 201 based on the screen items table 700 (FIG. 5: S101).

Here, the acceptance unit 401 notifies display of the function selection screen to the shortcut acceptance unit 403 the display of the function selection screen. Since icon pasting processing is already performed at this time, the shortcut acceptance unit 403 that received the notification refers to the pasting memory, and generates an icon-attached function item key by attaching an icon of the function item associated with the pasting target function item key to the pasting target function item in the function selection screen, and makes it display on the touch panel 201 (display 210*a*).

Figure 10A:
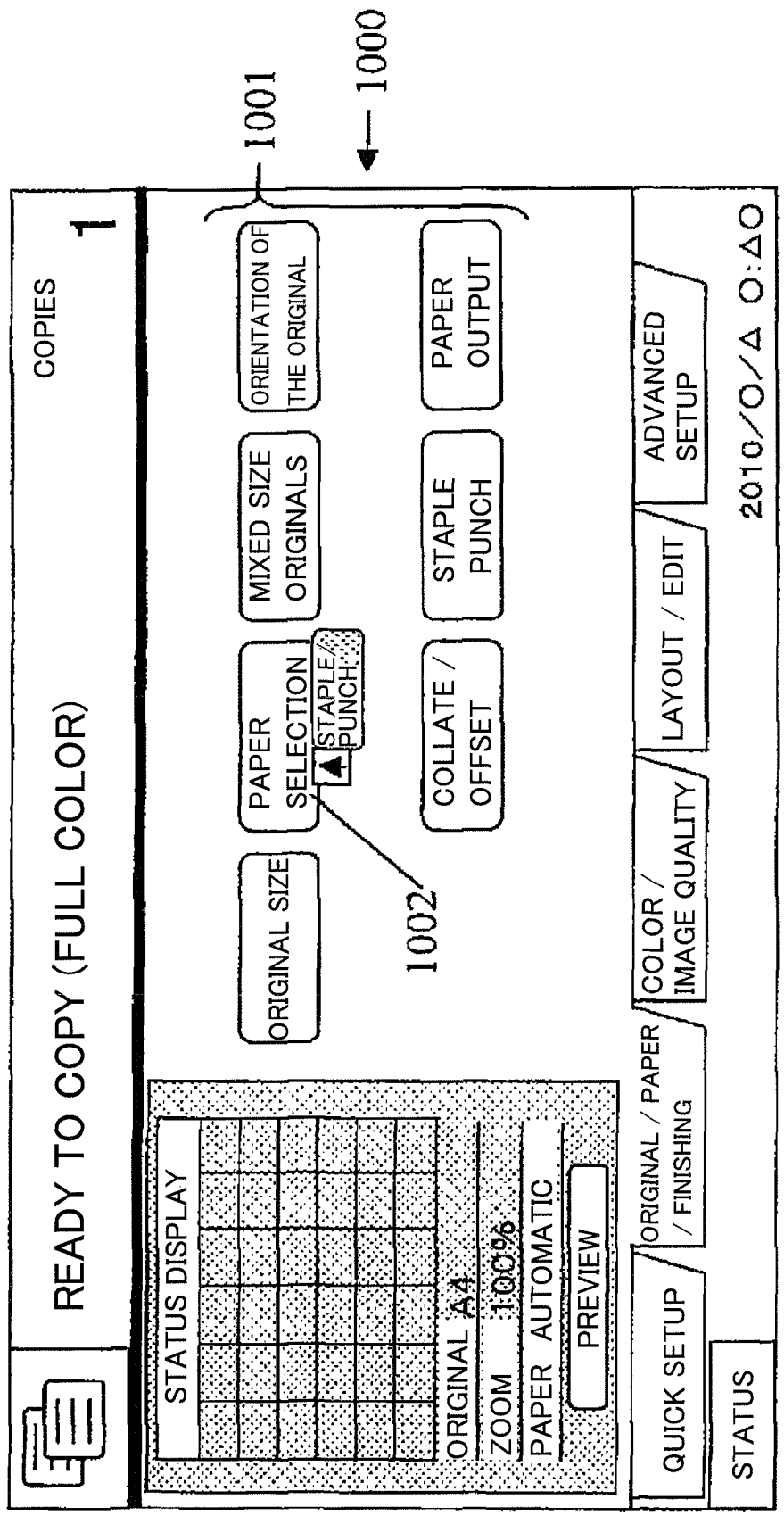
FIG. 10A is a diagram showing an example of a post-pasting function selection screen according to the embodiment of the present invention.

FIG. 10A is a diagram showing an example of the post-pasting function selection screen according to the embodiment of the present invention.

As shown in FIG. 10A, an icon-attached function item key ("PAPER SELECTION" key 1002 with "STAPLE/PUNCH" icon) is selectably displayed on the post-pasting function selection screen 1000 among the function item keys 1001.

Here, when the user selects the icon-attached function item key 1002 (FIG. 5: S103, YES), the shortcut acceptance unit 403 accepts the selection of the icon-attached function item key 1002 and notifies the selection to a integrated screen selection acceptance unit 409. The integrated screen selection acceptance unit 409 that received the notification refers to the pasting memory of the shortcut acceptance unit 403 and acquires the selected icon-carrying function item (pasting target function item "PAPER SELECTION"), and the function item of the icon ("STAPLE/PUNCH"). Next, the integrated screen selection acceptance unit 409 refers to the screen items table 700, and acquires a plurality of selection items (for example, "AUTOMATIC" 702*a*) corresponding to the acquired icon-carrying function item ("PAPER SELECTION" 701*a*) and a plurality of selection items (for example, "STAPLE/OFF" 702*b*) corresponding to the function item of the icon ("STAPLE/PUNCH" 701*b*). Then, the integrated screen selection acceptance unit 409 divides the integrated selection screen provided in advance into two in right and left uniformly, and displays the integrated selection screen on the touch panel 201 by arranging a plurality of selection items of the icon-carrying function item in the divided left part of the screen and a plurality of selection items of the function item of the icon in the divided right part of the screen (FIG. 6: S201).

It should be noted that when displaying the integrated selection screen, the integrated screen selection acceptance unit 409 communicates with the acceptance unit 401, and the background color of the selection item key corresponding to the setting condition is changed from white color to gray color when a predetermined setting condition is already set for the icon-carrying function item (pasting target function item and other function item) and the function item of the icon (function item which the selection of shortcut pasting is done). Meanwhile, when the setting condition is not set to the icon-carrying function item and the function item of the icon, the integrated screen selection acceptance unit 409 refers to the initial setting condition storage unit 404 and displays the selection item key corresponding to initial setting conditions with a white background.

FIG. 10B is a first diagram showing an example of the integrated selection screen according to the embodiment of the present invention.

As shown in FIG. 10B, the integrated selection screen 1003 selectably displays a plurality of selection item keys 1005 corresponding to the icon-carrying function item ("PAPER SELECTION") on the left screen 1004, and a plurality of selection item keys 1007 corresponding to the function item of the icon ("STAPLE/PUNCH") on another screen 1006. In addition, an upper part of the integrated selection screen 1003 selectably displays a message meaning that a setting screen for the two function items is shown ("PAPER SELECTION" and "STAPLE/PUNCH" 1008), and a lower part of the integrated selection screen 1003 selectably displays a shortcut delete key 1009, an OK key 1010, and a cancel key 1011.

Accordingly, the user can perform the condition setting for a plurality of function items (two in this embodiment) in the same screen, and therefore, it is possible to shorten the time needed for the key operation by reducing the number of times of key operation for setting the setting condition of a plurality of function items as compared to conventional techniques.

It should be noted that when there are many selection item keys that correspond to the icon-carrying function item or one of the function items of the icon, the integrated screen selection acceptance unit 409 adjusts the arrangement such that a plurality of selection item keys for each function item is displayed in the integrated selection screen by providing a scroll bar, and extending the display area of the integrated selection screen 1003 or reducing the size of the selection item key of the many selection item keys.

Now, when the user selects a predetermined selection item key (FIG. 6: S204, YES) (for example, "MANUAL TRAY" key 1005a) among a plurality of selection item keys 1005 and 1007 without selecting the OK key 1010 and the shortcut delete key 1009 (FIG. 6: S202 NO->S203, NO), the integrated screen selection acceptance unit 409 accepts the selection of the selection item key 1005a, and temporarily stores the setting condition corresponding to the selection item ("MANUAL TRAY") in a second setting memory (not illustrated) provided in advance, and thus the setting condition is set (FIG. 6: S205). After the setting is completed, the integrated screen selection acceptance unit 409 changes the background color of the selection item key ("AUTOMATIC" key) of the initial setting condition in the integrated selection screen from gray color to white color, and changes the background color of the selected selection item key ("MANUAL TRAY" key 1005a) from white color to gray color.

In addition, the integrated screen selection acceptance unit 409 notifies to the selection item prohibition unit 410 that the setting condition has been set. The selection item prohibition unit 410 that received the notification refers to the selection item prohibition table stored in the selection item prohibition storage unit 411, and acquires other selection item (prohibited selection item) which cannot be selected in combination with the selection item key 1005a that is selected by the user among the selection item keys 1005 and 1007 displayed on the integrated selection screen 1003.

Figure 11A:
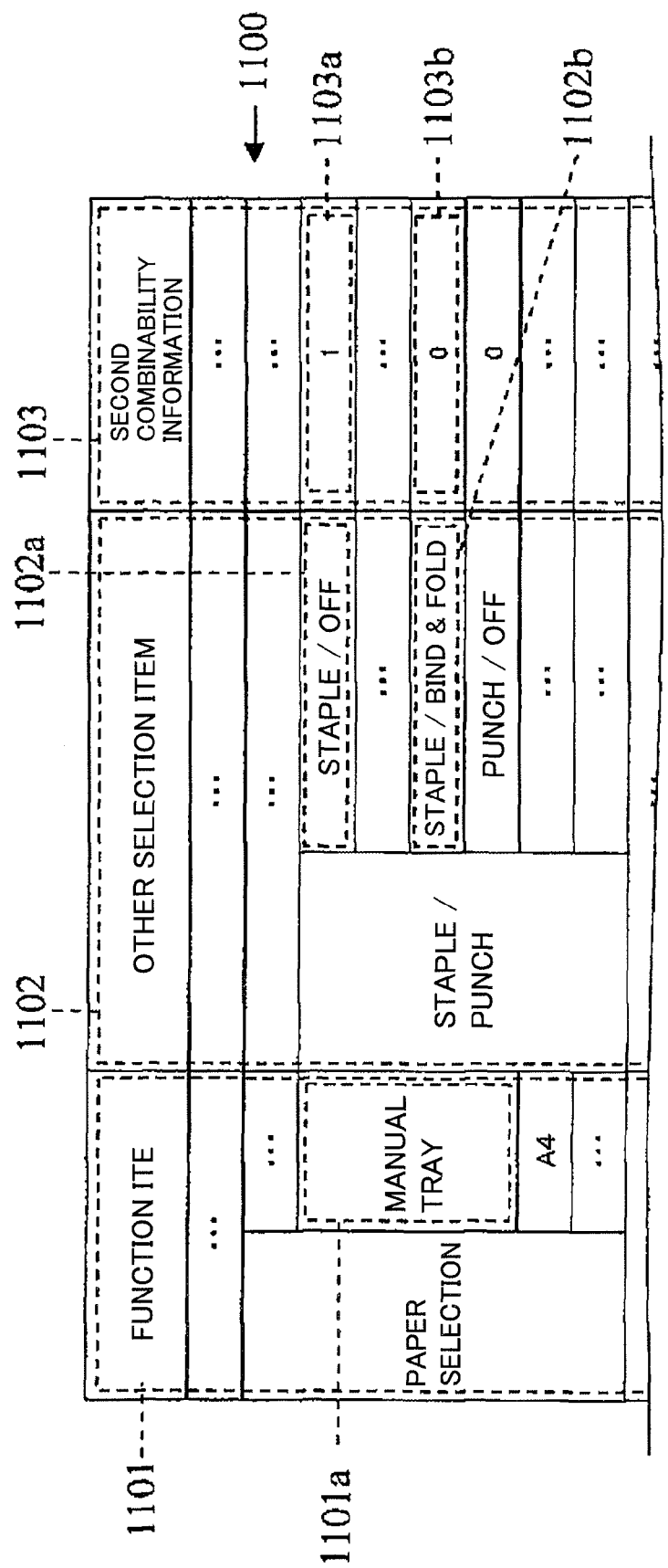
FIG. 11A is a diagram showing an example of a function item prohibition table according to the embodiment of the present invention.

FIG. 11A is a diagram showing an example of the function item prohibition table according to the embodiment of the present invention.

As shown in FIG. 11A, a selection item 1101 (for example, "MANUAL TRAY" 1101a); other selection item different from the selection item (for example, "STAPLE/OFF" 1102a, "STAPLE/BIND & FOLD" 1102b); second combinability information 1103 that indicates whether or not the selection item and the other selection item can be selected in combination (for example, "1" 1103a that indicates they can be selected, and "0" 1103b that indicates that they cannot be selected); are associated with each other and stored in the function item prohibition table 1100.

For example, when the selection item 1101 is "MANUAL TRAY" 1101a and the other selection item 1102 is "STAPLE/OFF" 1102a, since "MANUAL TRAY" and "STAPLE/OFF" can be selected in combination, the second combinability information 1103 that corresponds to this combination is associated with and is stored "1" 1103a.

Meanwhile, when the selection item 1101 is "MANUAL TRAY" 1101a and the other selection item 1102 is "STAPLE/BIND & FOLD" 1102b, since "MANUAL TRAY", and "BIND & FOLD" cannot be selected in combination, the second combinability information 1103 that corresponds to this combination is associated with and stores "0" 1103b.

The selection item prohibition unit 410 that has referred the selection item prohibition table 1100 acquires other selection item ("STAPLE/BIND & FOLD" 1102b) in which the second combinability information 1103 is "0" 1103b as a prohibited selection item among the other selection item 1102 corresponding to the selected selection item that is one of the selected selection item "MANUAL TRAY". Then, the selection item prohibition unit 410 displays a selection disable display ("X"), such as one described above, to the acquired prohibited selection item among the selection item keys that the integrated screen selection acceptance unit 409 displays, and prohibits acceptance of the selection of the prohibited selection item key which is selected by the integrated screen selection acceptance unit 409 (FIG. 6: S206).

In addition, the integrated screen selection acceptance unit 409 displays the integrated selection screen after providing the notification to the selection item prohibition unit 410 (FIG. 6: S201).

Figure 11B:
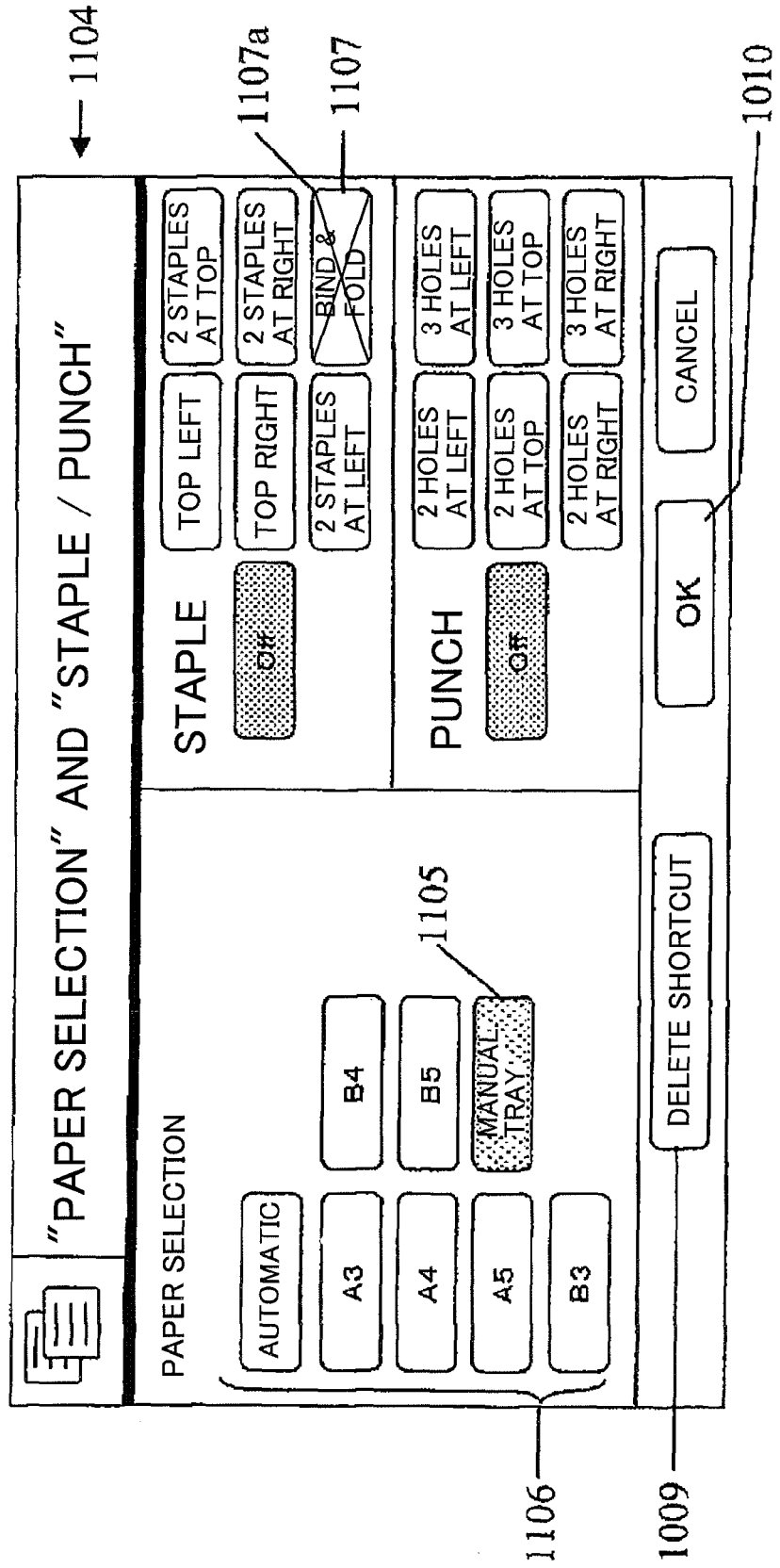
FIG. 11B is a second figure showing an example of a integrated selection screen according to the embodiment of the present invention.

FIG. 11B is a second diagram showing an example of the integrated selection screen according to the embodiment of the present invention.

As shown in FIG. 11B, other selection item key 1106 which can be selected in combination with the selection item key 1105 ("MANUAL TRAY" key) that has been selected previously, and a prohibited selection item key 1107 to which the selection disable display 1107a is displayed are displayed in the integrated selection screen 1104.

Accordingly, the user does not do vain key operation to select a prohibited selection item key which cannot be selected in combination with the selection item key that has been selected previously, and furthermore, the user can immediately confirm visually the selection item key that can be selected next and the selection item key that cannot be selected, and can perform operation work of the selection item key smoothly.

Meanwhile, in S201, when the user selects a shortcut delete key 1009 in the integrated selection screen (FIG. 6: S203, YES), the integrated screen selection acceptance unit 409 accepts the selection of the shortcut delete key 1009 and notifies the selection to the shortcut acceptance unit 403. The shortcut acceptance unit 403 that received the notification deletes the pasting target function item ("PAPER SELECTION") and the function item that becomes an icon ("STAPLE/PUNCH") stored temporarily in the pasting memory, and cancels the icon pasting processing (FIG. 6: S207).

When the icon pasting processing is canceled, the shortcut acceptance unit 403 notifies the cancellation to the acceptance unit 401. Although the acceptance unit 401 that received the notification newly displays a function selection screen based on the screen items table 700 (FIG. 5: S101), the shortcut acceptance unit 403 do not attach an icon to the function item key which becomes displayed in the function selection screen because the icon pasting processing is canceled. Thus, the user can cancel at the user's discretion icon pasting for the function item key to which an icon is already attached.

Now, in S201, when the user selects an OK key 1010 in the integrated selection screen (FIG. 5: S202), the integrated screen selection acceptance unit 409 accepts the selection of the OK key 1010, and notifies to the acceptance unit 401 the selection and the setting condition stored temporarily in the second setting memory. The acceptance unit 401 that received the notification accepts the setting condition and temporarily stores the setting condition in the first setting memory, and displays the function selection screen based on the screen items table 700 as well (FIG. 5: S101).

Here, when the user confirms the function selection screen and selects a start key 205 (FIG. 5: S102, YES), the acceptance unit 401 accepts the selection of the start key 205, and notifies to the image forming medium 412 the setting condition that has been accepted until then and the selection of the start key 205. The image forming unit 412 that received the notification performs image forming processing based on the setting condition (FIG. 5: S115). Thus, the image forming processing is performed. Implementation examples and comparison examples according to the present embodiment of the present invention An example that exhibits the above advantageous effects will be described. Although the result may vary in some degree depending on the number of function items, the number of selection items, the size of display areas in the function selection screen, the function setting screen and the integrated selection screen, and the size of item keys, and the like, the following results will be described below for a case of an operation unit (operation unit of the implementation example) having a configuration (the shortcut acceptance unit 403, integrated screen selection acceptance unit 409) of the embodiment of the present invention.

In the operation unit of the implementation example, in a case in which the user sets the setting condition of each selection item ("MANUAL TRAY" and "STAPLE/TOP LEFT") of two function items ("PAPER SELECTION" and "STAPLE/PUNCH"), if an icon of "STAPLE/PUNCH" is already pasted on "PAPER SELECTION", the user selects an icon-attached "PAPER SELECTION" of the "STAPLE/PUNCH", and selectably displays in the same screen the selection item key of "PAPER SELECTION" and the selection item key of "STAPLE/PUNCH", and thus "MANUAL TRAY" key and "STAPLE/TOP LEFT" key could be selected in combination. As a result, the time needed for the key operation work for the selection (setting), only took several seconds.

Meanwhile, in a state in which the icon of "STAPLE/PUNCH" is not yet pasted on "PAPER SELECTION", the user uses the operation unit of the implementation example having the shortcut pasting acceptance unit 405 and the pasting target acceptance unit 406, and selects the shortcut pasting key in the function setting screen where a plurality of selection item keys are displayed, and thus the icon of "STAPLE/PUNCH" was pasted on "PAPER SELECTION". The time needed for the key operation work for the attachment is several seconds. However, in a case in which a key operation work of icon pasting has been done once and thereafter setting the same setting condition, the target selection (setting) can be easily done by only selecting an icon-attached "PAPER SELECTION" key of "STAPLE/PUNCH" as described above, and the key operation work for the selection can be significantly reduced (for example, operation of only 3 times) for the user thereafter, and the time needed for the operation could be shortened (several seconds).

In contrast, in an operation unit that has the same configuration with the operation unit of the implementation example except that configuration of the embodiment of the present invention (shortcut acceptance unit 403 and integrated screen selection acceptance unit 409) is not provided, the results are as follows.

In the operation unit of the comparative example, when setting the same setting condition as the setting condition set in the operation unit of the implementation example, the user first selected "PAPER SELECTION" key in the function setting screen where "PAPER SELECTION" key and "STAPLE/PUNCH" key are displayed, and thereafter selected "MANUAL TRAY". Next, after selecting the OK key from the function setting screen, the screen returned to the function selection screen, a new "STAPLE/PUNCH" key was searched for, the "STAPLE/PUNCH" key was selected, and the function setting screen corresponding to "STAPLE/PUNCH" was displayed. Then, "STAPLE/TOP LEFT" key of the function setting screen was selected. Thus, the intended selection (setting) was completed.

Accordingly, a key operation work for switching the display between the function selection screen and the function setting screen is included in the key operation work for the selection (for example, 5 times). Furthermore, the time required for finding "STAPLE/PUNCH" key tends to be longer according to the user, and there was a case that eventually took several seconds to tens of seconds.

Furthermore, when another user thereafter sets the same setting condition as the above using the operation unit of the comparative example, the switching of the display between the function selection screen and the function setting screen, and the finding of the function item key are needed as in the above, and there is a tendency to require the same range of time as the time required for the key operation work of the former user (several seconds to tens of seconds) for the key operation work for the selection. Therefore, it can be understood that efficiency of the key operation work for each user is remarkably bad.

Therefore, in the operation unit of the implementation example, it can be understood that while the number of times of key operation for setting the setting condition for the two function items can be reduced as compared with the operation unit of the comparative example, and the time needed for the key operation can be shortened.

Thus, the operation unit 102 of the present embodiment is provided with: a shortcut acceptance unit 403 which accepts the selection of the icon-attached function item key from the user by attaching, upon displaying a plurality of function item keys, to the pasting target function item key selected by the user in advance, among the plurality of function item keys, an icon indicating a shortcut of the function item key different from the pasting target function item key; and integrated screen selection acceptance unit 409 which displays a selection item key corresponding to the icon-carrying function item and the selection item key corresponding to the function item of the icon in the same screen (the integrated screen selection), when the icon-attached function item key is selected, and accepts the selection of a predetermined selection item key from the user.

With such a configuration, when the user selects a function item key to which an icon is pasted (icon-attached function item), it is possible to select in the same screen the selection of a selection item key corresponding to the selected function item (icon-carrying function item) and the selection of a selection item key corresponding to the function item of the icon. Therefore, the user can perform the condition settings for two function items together in the same screen, and it is possible to reduce the number of times of key operation for setting the setting conditions for the two function items, and to shorten the time needed for the key operation, as compared with conventional techniques.

It should be noted that although the shortcut acceptance unit 403 according to the embodiment of the present invention is configured to paste an icon of one function item key to one pasting target function item key, other configurations may be used. For example, the shortcut acceptance unit 403 may be configured to paste icons for a plurality of function item keys to one pasting target function item key. In this case, the pasting target acceptance unit 406 accepts the selection of a plurality of function item keys from the user, and the integrated screen selection acceptance unit 409 is configured to selectably display the selection item key corresponding to the icon-carrying function item and the selection item key corresponding to the function item of all the icons in the same screen. With such a configuration, it is possible to handle the setting condition that is set by combining a plurality of function items also in the same screen, and to reduce the number of times of key operations and to shorten the time needed for the key operation work when dealing with the increase of the function items.

In addition, although the operation unit 102 according to the embodiment of the present invention is configured so that when a predetermined function item key is selected by the user among a plurality of function item keys that are selectably displayed, the selection of the predetermined selection item key from the user is accepted among a plurality of selection item keys corresponding to the selected function item, but other configurations may be adopted. That is, the operation unit 102 is not limited to a configuration (two hierarchy configuration) in which a plurality of selection items are associated with the function item, the present invention can be applied to a configuration in which an intermediate item is present in between the function item and the selection item (multi hierarchy configuration), and a configuration in which there are a plurality of intermediate items in the functional items, a plurality of selection items are also provided in the intermediate items in a tree structure, and a screen for selecting and setting the function items are provided (tree configuration). When adopting such a configuration, it is possible to achieve the reduction of the number of times of key operations, and the shortening of the time needed for the key operation work described above.

In addition, the shortcut acceptance unit 403 according to the embodiment of the present invention is configured so that the function item key to be pasted (for example, "STAPLE/PUNCH" key) and the pasting target function item key (for example, "PAPER SELECTION" key) are function item keys belonging to a predetermined tab item (for example, "ORIGINAL/PAPER/FINISHING"), but other configurations may be adopted. For example, in a plurality of function items that are respectively assigned to a plurality of tab items (for example, "ORIGINAL/PAPER/FINISHING", "COLOR/IMAGE QUALITY"), two of the plurality of function item keys (for example, "STAPLE/PUNCH" key belonging to "ORIGINAL/PAPER/FINISHING", and "FULL COLOR" key belonging to "COLOR/IMAGE QUALITY") belonging to different tab items may be configured as a pasting function item key and a pasting target function item key. In such a configuration, when one tab item key is selectably displayed for the user among a plurality of tab item keys in the pasting target selection screen and a predetermined tab item key is selected, for example, it may be configured to selectably display the function item key belonging to the tab item to the user, and make the function item key belonging to a tab item selectable at the user's discretion for each tab item.

In addition, the integrated screen selection acceptance unit 409 according to the embodiment of the present invention is configured so that, when the icon-attached function item key is selected, a plurality of selection item keys corresponding to the icon-carrying function item and a plurality of selection item keys corresponding to the function item of the icon are selectably displayed in the same screen, but other configurations may be adopted. For example, the integrated screen selection acceptance unit 409 may have a configuration that selectably displays all the selection item keys corresponding to the icon-carrying function item and the function item of the icon in the same screen, and may have a configuration that selectably displays a part of the selection item keys that corresponds to the icon-carrying function item and the function item of the icon in the same screen. In addition, the integrated screen selection acceptance unit 409 may have a configuration that selectably displays selection item keys having high frequency of being selected by the user among the selection item keys corresponding to the icon-carrying function item and the function item of the icon in the same screen according to the size of the integrated selection screen.

In addition, although the operation unit 102 according to the embodiment of the present invention is adopted for processes in a copying service of the multi function peripheral 100, it may be also adopted for a facsimile transmitting and receiving service and a printing service, for example. Furthermore, although the embodiment of the present invention is explained for the case in which the operation unit 102 is applied to a multi function peripheral, there are the same functions and advantage effects when applying to various image forming apparatuses, various electronic systems, various measuring apparatuses, or the like, having the operation unit 102 (operation apparatus) having the touch panel 201.

In addition, although the embodiment of the present invention is configured such that the operation unit 102 is provided with the above unit, but the operation unit 102 may be configured to make programs for realizing each unit to be stored in storage media and to provide the storage media. In such a configuration, the operation unit 102 or the multi function peripheral 100 reads the program, and the operation unit 102 or multi function peripheral 100 realizes each unit. In this case, the program that is read from the recording medium itself has functions and advantageous effects of the present embodiment. Furthermore, it is possible to provide the steps performed by each unit as a method for storing in a hard disk.

As described above, the operation apparatus, the image forming apparatus using the same, and the operation method according to the present embodiment are useful in a copying machine, a printer, and the like, in addition to a multi function peripheral, and are useful for the operation apparatus, the image forming apparatus using the same, and the operation method that can reduce the number of times of key operation for setting the setting condition for at least two function items and shorten the time needed for the key operation.

What is claimed is:

1. An operation apparatus comprising:
   a touch display panel which selectably displays at least a plurality of function item keys, and selection item keys corresponding to each of the plurality of function item keys;
   an acceptance unit which causes the touch display panel to display a function selection screen where the plurality of function item keys are displayed and a function setting screen where a plurality of selection item keys that correspond to a function item key selected from the plurality of function item keys are displayed;
   a shortcut acceptance unit which generates an icon-attached function item key by pasting an icon indicating a shortcut of one function item key to a pasting target function item key which is the other function item key selected from the plurality of function item keys, the one function item key being selected from the plurality of function item keys and different from the pasting target function item key, the shortcut acceptance unit causing the touch display panel to selectably display the icon-attached function item key which replaces the pasting target function item key at a same location thereof, and accepting a selection of the icon-attached function item key;
   an integrated screen selection acceptance unit which, when the shortcut acceptance unit accepts the selection of the icon-attached function item key, causes the touch display panel to display an integrated selection screen which selectably displays one selection item key and the other selection item key simultaneously in a plurality of areas separate from each other of a same screen, the one selection item key corresponding to the pasting target function item key that configures the icon-attached function item key, and the other selection item key corresponding to the one function item key that is identified by the icon, and the integrated screen selection acceptance unit accepting a selection of selection item keys; and
   a selection item prohibition unit which prohibits acceptance of a selection of a prohibited selection item key that is not selectable in combination with a predetermined selection item key, when the predetermined selection item key is selected by a user in a case in which the integrated screen selection acceptance unit accepts the selection of selection item keys.

2. The operation apparatus according to claim 1 further comprising:
   a shortcut pasting acceptance unit which accepts an instruction to paste the icon indicating the shortcut of the one function item key to the other function item key in a state in which the function setting screen is displayed in the touch display panel; and
   a pasting target acceptance unit which accepts a selection of the pasting target function item key.

3. The operation apparatus according to claim 2 further comprising:
   a function item prohibition unit which prohibits acceptance of a selection of a prohibited function item key that is not selectable in combination with a predetermined function item key of the icon among other function item keys, when the pasting target acceptance unit accepts the selection of the pasting target function item key.

4. An image forming apparatus having an operation apparatus, the operation apparatus comprising:
   a touch display panel which selectably displays at least a plurality of function item keys, and selection item keys corresponding to each of the plurality of function item keys;
   an acceptance unit which causes the touch display panel to display a function selection screen where the plurality of function item keys are displayed and a function setting screen where a plurality of selection item keys that correspond to a function item key selected from the plurality of function item keys are displayed;
   a shortcut acceptance unit which generates an icon-attached function item key by pasting an icon indicating a shortcut of one function item key to a pasting target function item key which is the other function item key selected from the plurality of function item keys, the one function item key being selected from the plurality of function item keys and different from the pasting target function item key, the shortcut acceptance unit causing the touch display panel to selectably display the icon-attached function item key which replaces the pasting target function item key at a same location thereof, and accepting a selection of the icon-attached function item key;
   an integrated screen selection acceptance unit which, when the shortcut acceptance unit accepts the selection of the icon-attached function item key, causes the touch display panel to display an integrated selection screen which selectably displays one selection item key and the other selection item key simultaneously in a plurality of areas separate from each other of a same screen, the one selection item key corresponding to the pasting target function item key that configures the icon-attached function item key, and the other selection item key corresponding to the one function item key that is identified by the icon, and the integrated screen selection acceptance unit accepting a selection of selection item keys; and
   a selection item prohibition unit which prohibits acceptance of a selection of a prohibited selection item key that is not selectable in combination with a predetermined selection item key, when the predetermined selection item key is selected by a user in a case in which the integrated screen selection acceptance unit accepts the selection of selection item keys.

5. The image forming apparatus according to claim 4 further comprising:
   a shortcut pasting acceptance unit which accepts an instruction to paste the icon indicating the shortcut of the one function item key to the other function item key in a state in which the function setting screen is displayed in the touch display panel; and
   a pasting target acceptance unit which accepts a selection of the pasting target function item key.

6. The image forming apparatus according to claim 5 further comprising:
   a function item prohibition unit which prohibits acceptance of a selection of a prohibited function item key that is not selectable in combination with a predetermined function item key of the icon among other function item keys, when the pasting target acceptance unit accepts the selection of the pasting target function item key.

7. An operation method for an operation apparatus to accept a selection of a selection item key from a user among a plurality of selection item keys corresponding to function item keys, the method comprising:
   a step performed by the operation apparatus for causing a touch display panel to selectably display at least a plurality of function item keys, and selection item keys corresponding to each of the plurality of function item keys;

a step performed by the operation apparatus for causing the touch display panel to display a function selection screen where the plurality of function item keys are displayed, and a function setting screen where a plurality of selection item keys that correspond to a function item key selected from the plurality of function item keys are displayed;

a step performed by the operation apparatus for generating an icon-attached function item key by pasting an icon indicating a shortcut of one function item key to a pasting target function item key which is the other function item key selected from the plurality of function item keys, the one function item key being selected from the plurality of function item keys and different from the pasting target function item key, the operation apparatus causing the touch display panel to selectably display the icon-attached function item key which replaces the pasting target function item key at a same location thereof, and for accepting a selection of the icon-attached function item key; and;

a step performed by the operation apparatus for causing, when the selection of the icon-attached function item key is accepted, the touch display panel to display an integrated selection screen which selectably displays one selection item key and the other selection item key simultaneously in a plurality of areas separate from each other of a same screen, the one selection item key corresponding to the pasting target function item key that configures the icon-attached function item key, and the other selection item key corresponding to the one function item key that is identified by the icon, and the operation apparatus for accepting a selection of selection item keys;

wherein a selection item prohibition unit which prohibits acceptance of a selection of a prohibited selection item key that is not selectable in combination with a predetermined selection item key, when the predetermined selection item key is selected by a user in a case in which the integrated screen selection acceptance unit accepts the selection of selection item keys.

* * * * *